(12) United States Patent
Blandizzi et al.

(10) Patent No.: US 11,565,723 B2
(45) Date of Patent: Jan. 31, 2023

(54) SYSTEMS AND METHODS FOR VEHICLE MOTION PLANNING

(71) Applicant: Argo AI, LLC, Pittsburgh, PA (US)

(72) Inventors: Pietro Blandizzi, Munich (DE); Randall Schur, Pittsburgh, PA (US); Constantin Savtchenko, Sewickley, PA (US)

(73) Assignee: ARGO AI, LLC, Pittsburgh, PA (US)

( * ) Notice: Subject to any disclaimer, the term of this patent is extended or adjusted under 35 U.S.C. 154(b) by 204 days.

(21) Appl. No.: 17/179,524

(22) Filed: Feb. 19, 2021

(65) Prior Publication Data

US 2022/0266874 A1 Aug. 25, 2022

(51) Int. Cl.
*B60W 60/00* (2020.01)
*B60W 40/06* (2012.01)

(52) U.S. Cl.
CPC ...... *B60W 60/00274* (2020.02); *B60W 40/06* (2013.01); *B60W 2554/20* (2020.02); *B60W 2554/4045* (2020.02); *B60W 2554/802* (2020.02)

(58) Field of Classification Search
None
See application file for complete search history.

(56) References Cited

U.S. PATENT DOCUMENTS

| 9,428,187 | B2 | 8/2016 | Lee |
| 2019/0025841 | A1 | 1/2019 | Haynes et al. |
| 2019/0061765 | A1 | 2/2019 | Marden et al. |
| 2020/0122721 | A1* | 4/2020 | Zhang ............ B60W 60/00274 |
| 2020/0398894 | A1 | 12/2020 | Hudecek et al. |
| 2021/0163010 | A1* | 6/2021 | Takabayashi ........... G08G 1/16 |

FOREIGN PATENT DOCUMENTS

WO 2017079349 A1 5/2017

OTHER PUBLICATIONS

Min; "RNN-Based Path Prediction of Obstacle Vehicles with Deep Ensemble"; IEEE Transactions on Vehicular Technology; vol. 68, No. 10; Oct. 2019 (Year: 2019).*

(Continued)

*Primary Examiner* — David P. Merlino
(74) *Attorney, Agent, or Firm* — Fox Rothschild LLP

(57) ABSTRACT

Systems/methods for operating an autonomous vehicle. The methods comprise: detecting an object in proximity to the autonomous vehicle; determining a path of travel for the object that comprises a number of data points that is equal to a given number of vehicle locations selected based on a geometry of a lane in which the object; generating cost curves respectively associated with the data points, each cost curve representing a displacement cost to be at a particular location along a given cross line that (i) passes through a respective data point of said data points and (ii) extends perpendicular to and between boundary lines of the lane; determining a polyline representing displacements of the cost curves from a center of the lane; defining a predicted path of travel for the object based on the polyline; and using the predicted path of travel for the object to facilitate autonomous driving operation(s).

20 Claims, 22 Drawing Sheets

(56) References Cited

OTHER PUBLICATIONS

Houenou, A., Bonnifait, P., Cherfaoui, V., & Yao, W. (Nov. 2013). Vehicle trajectory prediction based on motion model and maneuver recognition. In 2013 IEEE/RSJ international conference on intelligent robots and systems (pp. 1363-4369). IEEE. Added for publication in IEEE Xplore at Jan. 6, 2014.

Huang, S. et al., "Deep Learning Driven Visual Path Prediction from a Single Image," arXiv:1601.07265v1 [cs:CV] Jan. 2016.

Ahmen, S. et al., "Pedestrian and Cyclist Detection and Intent Estimation for Autonomous Vehicles: A Survey," Appl. Sci 2019, 9, 2335, doi:10:3390/app9112335, www.mdpi.com/journal/applsci, , pp. 1-39.

Aryal, M., "Object Detection, Classification, and Tracking for Autonomous Vehicle," Masters Thesis, https://scholarworks.gvsu.edu/theses/912, 2018, pp. 1-46.

* cited by examiner

SYSTEMS AND METHODS FOR VEHICLE MOTION PLANNING

BACKGROUND

Statement of the Technical Field

The present disclosure relates generally to vehicles. More particularly, the present disclosure relates to implementing systems and methods for vehicle motion planning.

Description of the Related Art

Modern day vehicles have at least one on-board computer and have internet/satellite connectivity. The software running on these on-board computers monitor and/or control operations of the vehicles. If the vehicle is an autonomous vehicle, it also comprises LiDAR detectors for detecting objects in proximity thereto. The LiDAR detectors generate LiDAR datasets that measure the distance from the vehicle to an object at a plurality of different times. These distance measurements can be used for tracking movements of the object, making predictions as to the objects trajectory, and planning paths of travel for the vehicle based on the object's predicted trajectory.

SUMMARY

The present disclosure concerns implementing systems and methods for operating an autonomous vehicle. The methods comprise performing the following operations by a computing device: detecting an object in proximity to the autonomous vehicle; determining a path of travel for the object that comprises a number of data points that is equal to a given number of vehicle locations selected based on a geometry of a lane in which the object is positioned; generating cost curves respectively associated with the data points (each cost curve representing a displacement cost to be at a particular location along a given cross line that (i) passes through a respective data point of said data points and (ii) extends perpendicular to and between boundary lines of the lane); determining a polyline representing displacements of the cost curves from a center of the lane; defining a predicted path of travel for the object based on the polyline; and/or using the predicted path of travel for the object to facilitate at least one autonomous driving operation of the autonomous vehicle.

In some scenarios, the methods also comprise: determining whether the object has a driving intention; and determining the path of travel for the object when a determination is made that the object has a driving intention. The given total number of vehicle locations may have different values for straight and curved lanes. Each data point of the path of travel may be aligned with and may reside on a center of the lane in a road map. Each data point may be longitudinally offset from a current location of the object.

In those or other scenarios, the cost curves are generated using at least one of a cost function representing a distance from the object to a left boundary of the lane, a cost function representing a distance from the object to a right boundary of the lane, a cost function representing how close the object should follow a center of the lane, a cost function representing location consistencies to the left and right boundaries of the lane, and a cost function representing locations that are close to static obstacles.

In those or other scenarios, the methods also comprise: generating a cost curve by combining the cost curves associated with each said data points; defining the polyline such that it comprises data points with coordinate values determined based on the minimum values of the combined cost curves. Additionally or alternatively, the methods comprise determining a forecasted path of travel for the object based on the predicted path of travel.

The implementing systems comprise: a processor; and a non-transitory computer-readable storage medium comprising programming instructions that are configured to cause the processor to implement the above described methods.

BRIEF DESCRIPTION OF THE DRAWINGS

The present solution will be described with reference to the following drawing figures, in which like numerals represent like items throughout the figures.

DETAILED DESCRIPTION

Figure 1:
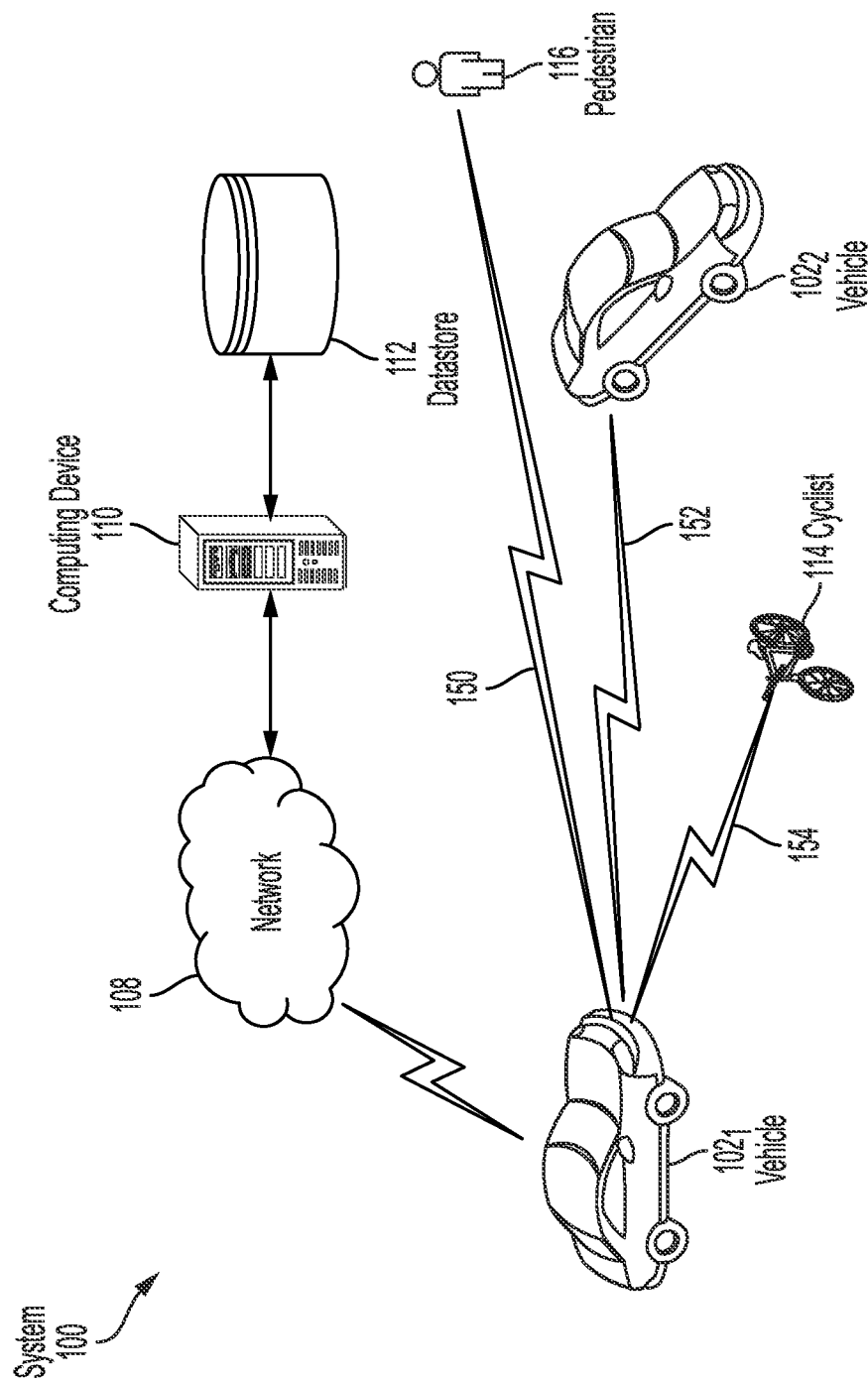
FIG. 1 is an illustration of an illustrative system.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

In this document, when terms such as "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

An autonomous vehicle (AV) must be able to predict the future trajectories of agents or objects in the scene in order to make safe and efficient behavior decisions. After understanding the intent of the agent, an ideal reference path is generated from their current location towards that goal. A reference path is an ideal trajectory through 2D space described by a polyline. It encodes an offset with a lane, trends on how actors take turns, basic contextual interactions (such as veering around static obstacles), and path relative to lane geometry. The ideal reference path is defined as a sequence of waypoints that an agent would follow in the ideal world. Hence, it realistically incorporates the road and scene features into the problem. A more realistic reference path will result to a more realistic predicted trajectory which would enhance the safety of the AV driving system. Furthermore, reference paths allow calculations of some constraints in real time about the actor's movement. Yielding constraints, applied in the form of speed and brake targets, are calculated by finding the intersection of the reference path with the AV route.

A current approach uses the centerline of lanes associated with the agent to generate a reference path starting from the current agent's position that slowly decays towards the center of the mapped lane over time. This current approach has the following limitations: causes improbable reference paths when lane width is not consistent (e.g., keyed lanes, narrowing lanes, or widening lanes); does not account for the increases in lateral offset (e.g., wide turns); does not account for vehicles cutting corners; does not account for using a full width of a large lane; does not predict vehicles to go around static obstacles (e.g., double parked vehicles in a lane); does not take into account different agent types; and does not take into account the fact that an agent is likely keeping the current lateral offset from the lane boundary.

The present solution addresses the above listed limitations of the current approach. Accordingly, the present solution concerns systems and methods for controlling vehicles using improved object trajectory generation algorithms. The methods generally involve computing reference paths of travel for a detected object by minimizing a combination of lateral displacement cost functions sampled along a lane. By using a set of cost functions to generate the reference paths of travel for the detected object, the present solution is able to forecast actions of other actors from a motion planning perspective. This forecasting is one novel aspect of the present solution. Another novel aspect of the present solution is the ability to generate realistic reference paths of travel for objects that capture lane geometries as well as the static scene. These novel aspects are achieved by use of cost functions to keep an offset in lane, use of costs to account for wide turns, use of costs to account for cutting corners, and/or taking into account the static obstacles.

The present solution is being described herein in the context of an autonomous vehicle. The present solution is not limited to autonomous vehicle applications. The present solution can be used in other applications such as robotic application, radar system application, metric applications, and/or system performance applications.

Illustrative Systems

Referring now to FIG. 1, there is provided an illustration of an illustrative system 100. System 100 comprises a vehicle 102$_1$ that is traveling along a road in a semi-autonomous or autonomous manner. Vehicle 102$_1$ may be an AV. The AV 102$_1$ can include, but is not limited to, a land vehicle (as shown in FIG. 1), an aircraft, or a watercraft.

AV 102$_1$ is generally configured to detect objects 102$_2$, 114, 116 in proximity thereto. The objects can include, but are not limited to, a vehicle 102$_2$, a cyclist 114 (such as a rider of a bicycle, electric scooter, motorcycle, or the like) and/or a pedestrian 116. This object detection can be made, for example, by analyzing sensor data generated by at least one sensor device on the AV 102$_1$ and/or information received from a communication device (e.g., a transceiver, a beacon and/or a smart phone) of the object via communication link(s) 150, 152, 154. The communication link(s) 150, 152, 154 can include, but are not limited to, V2X communication links. The term "V2X" refers to a communication between a vehicle an any entity that may affect, or may be affected by, the vehicle.

When such a detection is made, AV 102$_1$ performs operations to: generate one or more possible object trajectories (or predicted paths of travel) for the detected object; and use the at least one of the generated possible object trajectories (or predicted paths of travel) to facilitate a determination of a vehicle trajectory. The AV 102$_1$ may then perform operations to follow the vehicle trajectory.

In some scenarios, the AV 102$_1$ performs additional operations to determine whether or not there is an undesirable level of risk that a collision will occur between the AV and object in a threshold period of time (e.g., 1 minute). If so, the AV 102$_1$ performs operations to determine whether the collision can be avoided if the vehicle trajectory is followed by the AV 102$_1$ and any one of a plurality of dynamically generated emergency maneuvers is performed in pre-defined time period (e.g., N milliseconds). If the collision can be avoided, then the AV 102$_1$ takes no action or optionally performs a cautious maneuver (e.g., mildly slows down). In contrast, if the collision cannot be avoided, then the AV 102$_1$ immediately takes an emergency maneuver (e.g., brakes and/or changes direction of travel).

Figure 2:
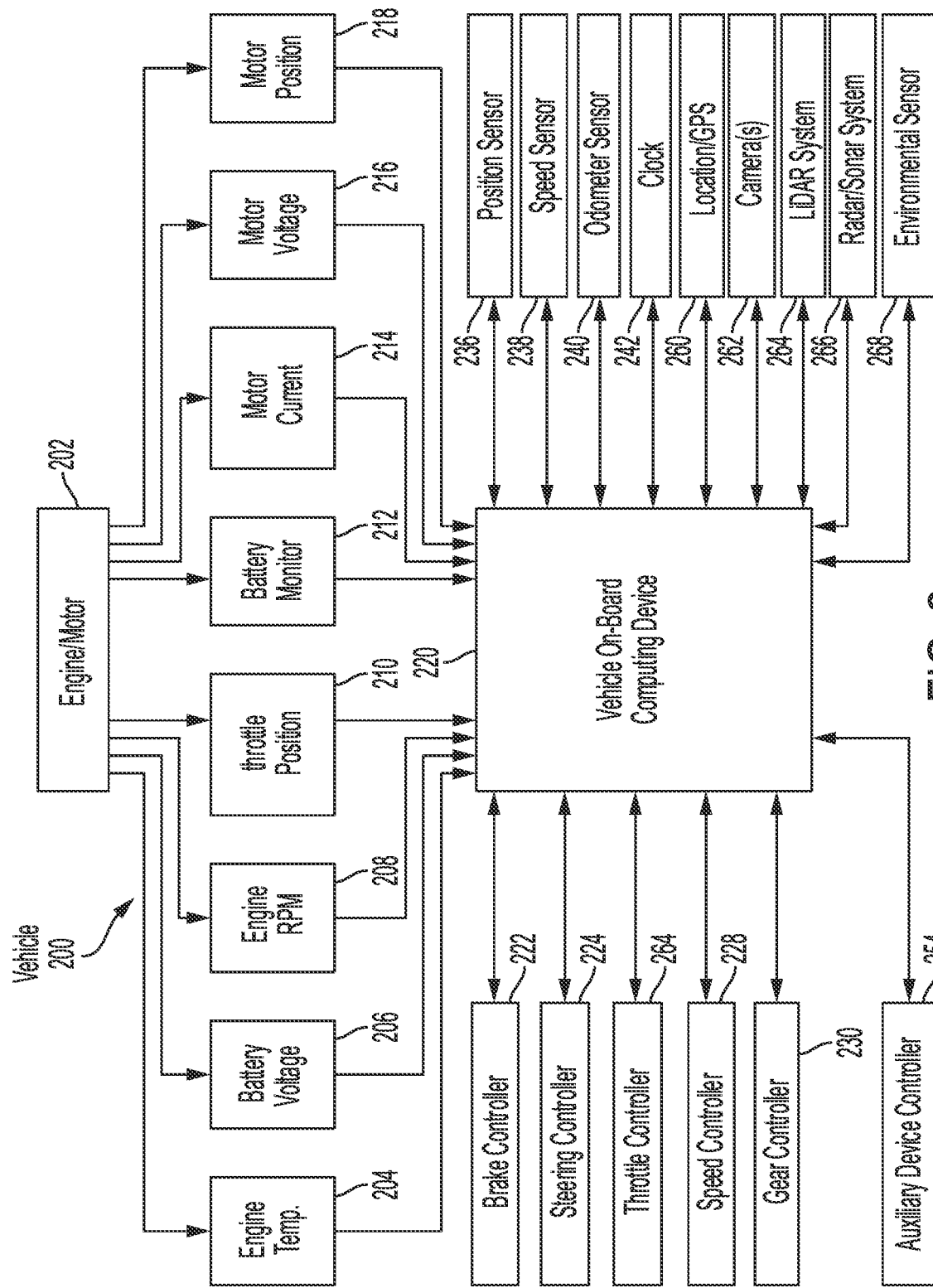
FIG. 2 is an illustration of an illustrative architecture for a vehicle.

Referring now to FIG. 2, there is provided an illustration of an illustrative system architecture 200 for a vehicle. Vehicles $102_1$ and/or $102_2$ of FIG. 1 can have the same or similar system architecture as that shown in FIG. 2. Thus, the following discussion of system architecture 200 is sufficient for understanding vehicle(s) $102_1$, $102_2$ of FIG. 1.

As shown in FIG. 2, the vehicle 200 includes an engine or motor 202 and various sensors 204-218 for measuring various parameters of the vehicle. In gas-powered or hybrid vehicles having a fuel-powered engine, the sensors may include, for example, an engine temperature sensor 204, a battery voltage sensor 206, an engine Rotations Per Minute (RPM) sensor 208, and a throttle position sensor 210. If the vehicle is an electric or hybrid vehicle, then the vehicle may have an electric motor, and accordingly will have sensors such as a battery monitoring system 212 (to measure current, voltage and/or temperature of the battery), motor current 214 and voltage 216 sensors, and motor position sensors such as resolvers and encoders 218.

Operational parameter sensors that are common to both types of vehicles include, for example: a position sensor 236 such as an accelerometer, gyroscope and/or inertial measurement unit; a speed sensor 238; and an odometer sensor 240. The vehicle also may have a clock 242 that the system uses to determine vehicle time during operation. The clock 242 may be encoded into the vehicle on-board computing device, it may be a separate device, or multiple clocks may be available.

The vehicle also will include various sensors that operate to gather information about the environment in which the vehicle is traveling. These sensors may include, for example: a location sensor 260 (e.g., a Global Positioning System (GPS) device); object detection sensors such as one or more cameras 262; a LiDAR sensor system 264; and/or a radar and/or a sonar system 266. The sensors also may include environmental sensors 268 such as a precipitation sensor and/or ambient temperature sensor. The object detection sensors may enable the vehicle to detect objects that are within a given distance range of the vehicle 200 in any direction, while the environmental sensors collect data about environmental conditions within the vehicle's area of travel.

During operations, information is communicated from the sensors to an on-board computing device 220. The on-board computing device 220 analyzes the data captured by the sensors and optionally controls operations of the vehicle based on results of the analysis. For example, the on-board computing device 220 may control: braking via a brake controller 232; direction via a steering controller 224; speed and acceleration via a throttle controller 226 (in a gas-powered vehicle) or a motor speed controller 228 (such as a current level controller in an electric vehicle); a differential gear controller 230 (in vehicles with transmissions); and/or other controllers.

Geographic location information may be communicated from the location sensor 260 to the on-board computing device 220, which may then access a map of the environment that corresponds to the location information to determine known fixed features of the environment such as streets, buildings, stop signs and/or stop/go signals. Captured images from the cameras 262 and/or object detection information captured from sensors such as LiDAR 264 is communicated from those sensors to the on-board computing device 220. The object detection information and/or captured images are processed by the on-board computing device 220 to detect objects in proximity to the vehicle 200. Any known or to be known technique for making an object detection based on sensor data and/or captured images can be used in the embodiments disclosed in this document.

LiDAR information is communicated from LiDAR sensor 264 to the on-board computing device 220. Additionally, captured images are communicated from the camera(s) 262 to the on-board computing device 220. The LiDAR information and/or captured images are processed by the on-board computing device 220 to detect objects in proximity to the vehicle 200. The manner in which the object detections are made by the on-board computing device 220 will become evident as the discussion progresses.

When the on-board computing device 220 detects a moving object, the on-board computing device 220 will generate one or more possible object trajectories for the detected object, and analyze the possible object trajectories to assess the risk of a collision between the object and the AV. If the risk exceeds an acceptable threshold, the on-board computing device 220 performs operations to determine whether the collision can be avoided if the AV follows a defined vehicle trajectory and/or implements one or more dynamically generated emergency maneuvers is performed in a pre-defined time period (e.g., N milliseconds). If the collision can be avoided, then the on-board computing device 220 may cause the vehicle 200 to perform a cautious maneuver (e.g., mildly slow down, accelerate, or swerve). In contrast, if the collision cannot be avoided, then the on-board computing device 220 will cause the vehicle 200 to take an emergency maneuver (e.g., brake and/or change direction of travel).

Figure 3:
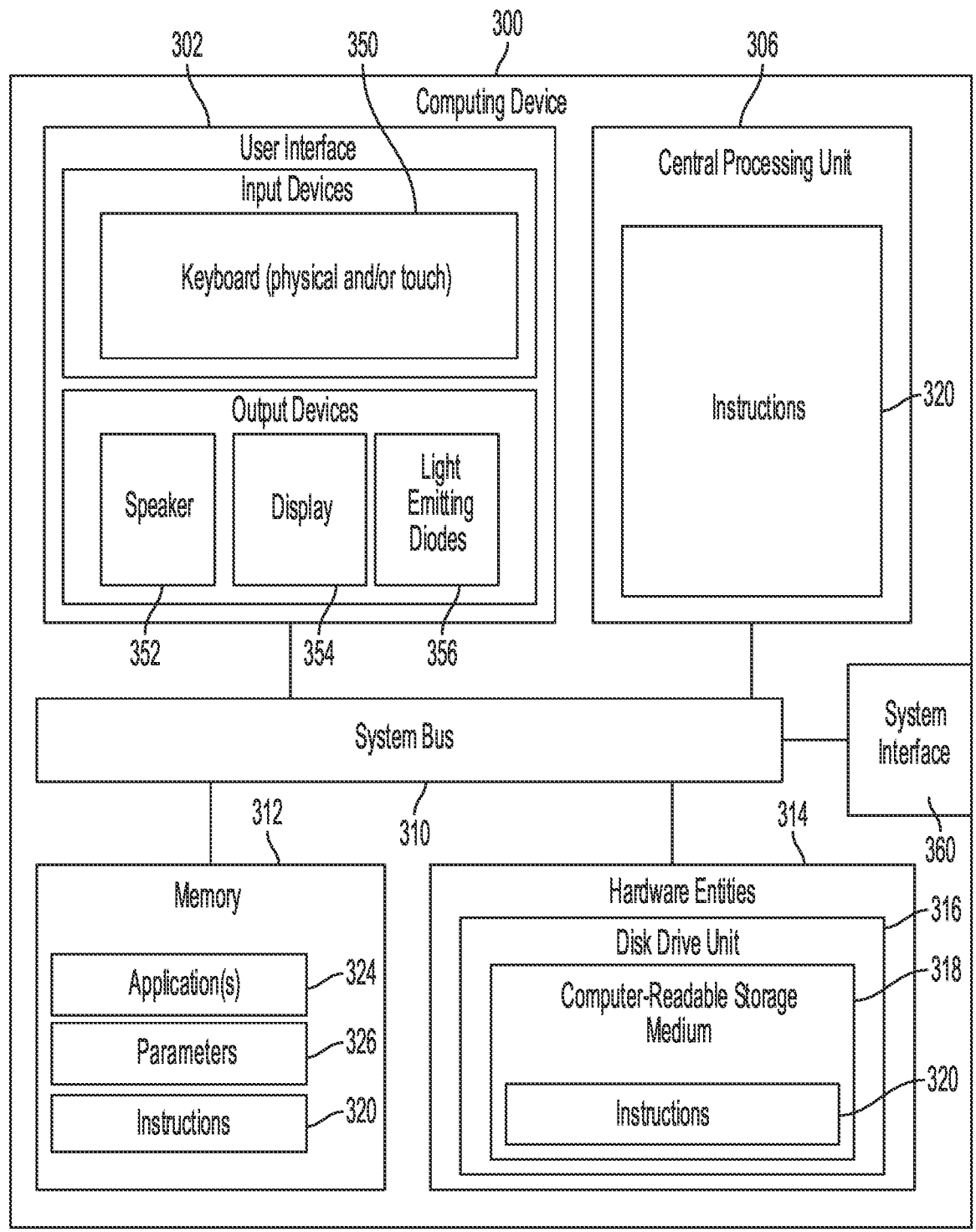
FIG. 3 is an illustration of an illustrative computing device.

Referring now to FIG. 3, there is provided an illustration of an illustrative architecture for a computing device 300. The computing device 110 of FIG. 1 and/or the vehicle on-board computing device 220 of FIG. 2 is/are the same as or similar to computing device 300. As such, the discussion of computing device 300 is sufficient for understanding the computing device 110 of FIG. 1 and the vehicle on-board computing device 220 of FIG. 2.

Computing device 300 may include more or less components than those shown in FIG. 3. However, the components shown are sufficient to disclose an illustrative solution implementing the present solution. The hardware architecture of FIG. 3 represents one implementation of a representative computing device configured to operate a vehicle, as described herein. As such, the computing device 300 of FIG. 3 implements at least a portion of the method(s) described herein.

Some or all components of the computing device 300 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 3, the computing device 300 comprises a user interface 302, a Central Processing Unit (CPU) 306, a system bus 310, a memory 312 connected to and accessible by other portions of computing device 300 through system bus 310, a system interface 360, and hardware entities 314 connected to system bus 310. The user interface can include input devices and output devices, which facilitate user-software interactions for controlling operations of the computing device 300. The input devices include, but are not limited to, a physical and/or touch keyboard 350. The input devices can be connected to the computing device 300 via a wired or wireless connection (e.g., a Bluetooth® connection). The output devices include, but are not limited to, a speaker 352, a display 354, and/or light emitting diodes 356. System interface 360 is configured to facilitate wired or wireless communications to and from external devices (e.g., network nodes such as access points, etc.).

At least some of the hardware entities 314 perform actions involving access to and use of memory 312, which can be a Random Access Memory (RAM), a disk drive, flash memory, a Compact Disc Read Only Memory (CD-ROM) and/or another hardware device that is capable of storing instructions and data. Hardware entities 314 can include a disk drive unit 316 comprising a computer-readable storage medium 318 on which is stored one or more sets of instructions 320 (e.g., software code) configured to implement one or more of the methodologies, procedures, or functions described herein. The instructions 320 can also reside, completely or at least partially, within the memory 312 and/or within the CPU 306 during execution thereof by the computing device 300. The memory 312 and the CPU 306 also can constitute machine-readable media. The term "machine-readable media", as used here, refers to a single medium or multiple media (e.g., a centralized or distributed database, and/or associated caches and servers) that store the one or more sets of instructions 320. The term "machine-readable media", as used here, also refers to any medium that is capable of storing, encoding or carrying a set of instructions 320 for execution by the computing device 300 and that cause the computing device 300 to perform any one or more of the methodologies of the present disclosure.

Figure 4:
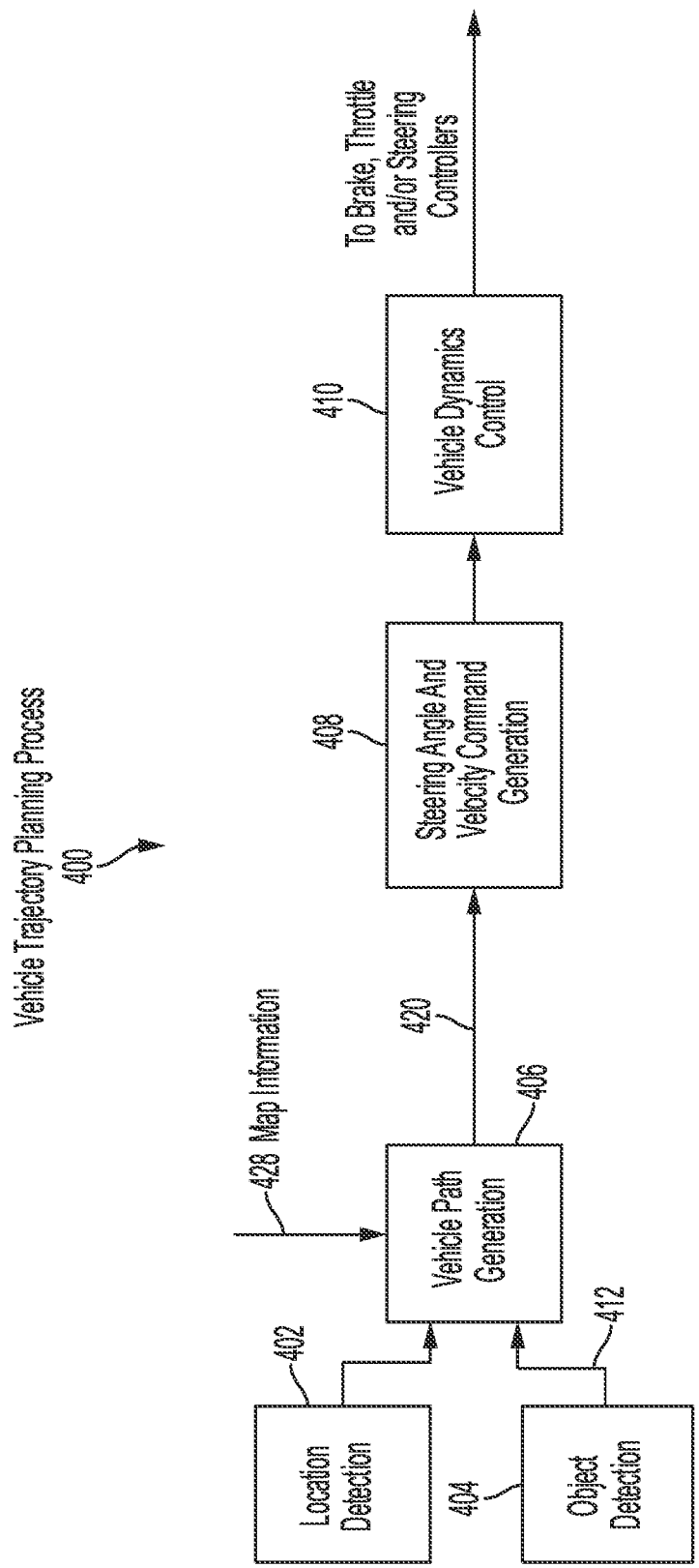
FIG. 4 provides a block diagram that is useful for understanding how vehicles control is achieved in accordance with the present solution.

Referring now to FIG. 4, there is provided a block diagram that is useful for understanding how vehicle control is achieved in accordance with the present solution. All of the operations performed in blocks 402-410 can be performed by the on-board computing device of a vehicle (e.g., AV 102₁ of FIG. 1).

In block 402, a location of the vehicle is detected. This detection can be made based on sensor data output from a location sensor (e.g., location sensor 260 of FIG. 2) of the vehicle. This sensor data can include, but is not limited to, GPS data. The detected location of the vehicle is then passed to block 406.

In block 404, an object is detected within proximity of the vehicle. This detection is made based on sensor data output from a camera (e.g., camera 262 of FIG. 2), a LiDAR system (e.g., LiDAR system 264 of FIG. 2), and/or a radar/sonar system 264 of the vehicle. Techniques for detecting objects are well known in the art. Any known or to be known object detection technique can be used herein. Information about the detected object is passed to block 406. This information includes, but is not limited to, a track (or spatial description) of the detected object. The track (or spatial description) may comprise at least one predicted trajectory or path of travel of the object, a speed of the object, a full extent of the object, a heading of the object, a direction of travel of the object, and/or a classification of the object. The predicted object trajectory or path of travel can include, but is not limited to, a linear path pointing in the direction of a lane or a curved path pointing in the direction of a lane.

This object detection information output from block 404 can be subsequently used to facilitate at least one autonomous driving operation (e.g., object tracking operations, object trajectory prediction operations, vehicle trajectory determination operations, and/or collision avoidance operations). For example, a future intention can be determined for the detected object based on sensor data. The future intention can include, but is not limited to, a driving intention. A lane may be associated with object which has a driving intention. The object's current location and lane particulars can be used to predict object trajectories or paths of travel in block 404, determine a vehicle trajectory in block 406, and/or trigger emergency maneuvers in block 406. The present solution is not limited to the particulars of this example.

In block 406, a vehicle trajectory is generated using the information from blocks 402 and 404. Techniques for determining a vehicle trajectory are well known in the art. Any known or to be known technique for determining a vehicle trajectory can be used herein without limitation. For example, in some scenarios, such a technique involves determining a trajectory for the AV that would pass the object when the object is in front of the AV, the object has a heading direction that is aligned with the direction in which the AV is moving, and the object has a length that is greater than a threshold value. The present solution is not limited to the particulars of this scenario. The vehicle trajectory 420 can be determined based on the location information from block 402, the object detection information from block 404, and map information 428 (which is pre-stored in a data store of the vehicle). The vehicle trajectory 420 may represent a smooth path that does not have abrupt changes that would otherwise provide passenger discomfort. For example, the vehicle trajectory is defined by a path of travel along a given lane of a road in which the object is not predicted to travel within a given amount of time. The vehicle trajectory 420 is then provided to block 408.

In block 408, a steering angle and velocity command is generated based on the vehicle trajectory 420. The steering angle and velocity command is provided to block 410 for vehicle dynamics control.

Vehicle Control

Referring now to FIG. 5, there is provided a flow diagram of an illustrative method 500 for controlling a vehicle (e.g., vehicle 102₁ of FIG. 1). At least a portion of method 500 is performed by a vehicle on-board computing device (e.g., vehicle on-board computing device 220 of FIG. 2). Method 500 is performed for each object (e.g., vehicle 102₂ of FIG. 1, cyclist 114 of FIG. 1, and/or pedestrian 116 of FIG. 1) that has been detected to be within a distance range from the vehicle at any given time.

Method 500 comprises a plurality of operations 502-530. The present solution is not limited to the particular order of operations 502-530 shown in FIG. 5. For example, the operations of 520 can be performed in parallel with the operations of 504-518, rather than subsequent to as shown in FIG. 5.

Figure 5A:
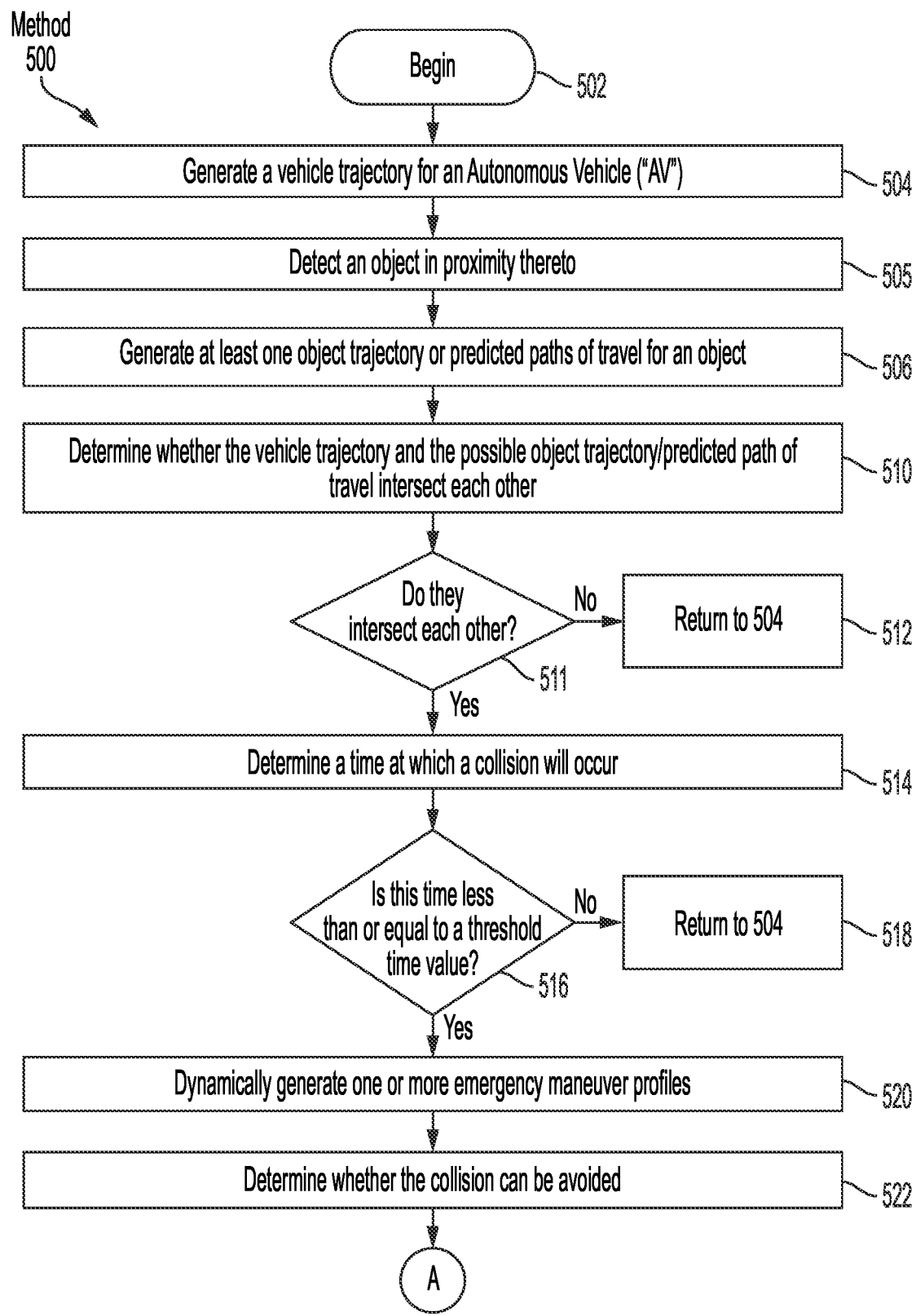
FIGS. 5A-5B (collectively referred to herein as "FIG. 5") provides a flow diagram of an illustrative method for controlling an autonomous vehicle using LiDAR decorrelation.

As shown in FIG. 5A, method 500 begins with 502 and continues with 504 where a vehicle trajectory (e.g., vehicle trajectory 420 of FIG. 4) for an AV is generated. The vehicle trajectory may represent a smooth path that does not have abrupt changes that would otherwise provide passenger discomfort, or may repent an emergency maneuver to avoid a collision. Techniques for determining a vehicle trajectory are well known in the art. Any known or to be known technique for determining a vehicle trajectory can be used herein without limitation. In some scenarios, the vehicle trajectory is determined based on location information generated by a location sensor (e.g., location sensor 260 of FIG. 2) of the AV, object detection information generated by the on-board computing device (e.g., on-board computing device 220 of FIG. 2) of the AV, images captured by at least one camera (e.g., camera 262 of FIG. 2) of the AV, map information stored in a memory (e.g., memory 412 of FIG. 4) of the AV, and/or lane information.

Once the vehicle trajectory is generated, method 500 continues with 505 where the AV performs operations to detect an object that is in proximity thereto. Object detection algorithms are well known in the art. Any known or to be known object detection algorithm can be used here. The object detection is then used to facilitate at least one autonomous driving operation (e.g., object tracking operations, object trajectory prediction operations, vehicle trajectory determination operations, and/or collision avoidance operations).

Accordingly, method 500 continues with 506 where one or more possible object trajectories or predicted paths of travel (e.g., possible object trajectories or predicted paths of travel 412 of FIG. 4) are determined for the object (e.g., vehicle $102_2$, cyclist 114 or pedestrian 116 of FIG. 1) detected in 505.

Next in 510, a determination is made as to whether the vehicle trajectory generated in 504 and the possible object trajectory/predicted path of travel generated in 506 intersect each other. If they do not intersect each other [511: NO], then 512 is performed where method 500 returns to 504.

In contrast, if they do intersect each other [511: YES], then method 500 continues to 514 where a time value is determined. This time value represents a time at which a collision will occur if the vehicle trajectory is followed by the AV and the possible object trajectory/predicted path of travel is followed by the object. The time value determined in 514 is then compared to a threshold time value, as shown by 516. The threshold time value is selected in accordance with a given application (e.g., one or more seconds). If the time value is greater than the threshold time value [516: NO], then 518 is performed where method 500 returns to 504. If the time value is equal to or less than the threshold time value [516: YES], then method 500 continues with 520-522. 520-522 involve: dynamically generating one or more emergency maneuver profiles based on the vehicle trajectory and the possible object trajectory/predicted path of travel; and determine whether the collision can be avoided if the vehicle trajectory is followed by the AV and any one of the emergency maneuvers is performed in a pre-defined time period (e.g., N milliseconds). Upon completing 522, method 500 continues with 524 of FIG. 5B.

Figure 5B:
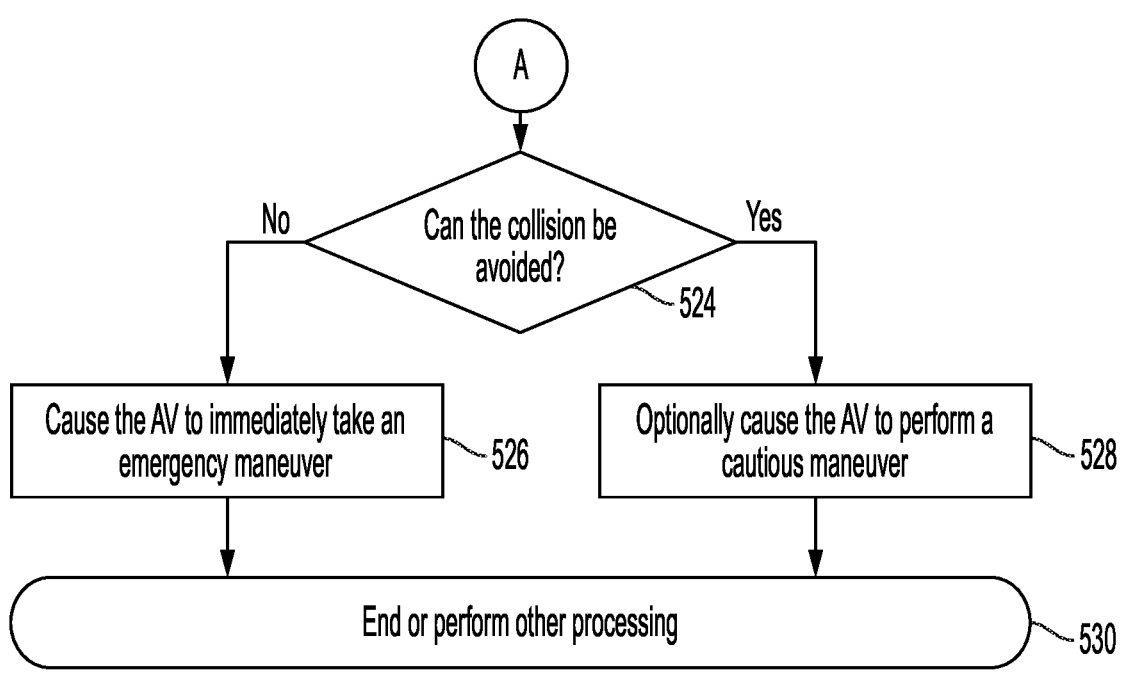

Referring now to FIG. 5B, if the collision cannot be avoided in the pre-defined time period [524: NO], then 526 is performed where the AV is caused to immediately take an emergency maneuver. The emergency maneuver can include, but is not limited to, one of the dynamically generated emergency maneuvers discussed above in relation to 520. Techniques for causing an AV to take emergency maneuvers are well known in the art. Any known or to be known technique for causing an AV to take emergency maneuvers can be used here. Subsequently, 530 is performed where method 500 ends or other processing is performed.

In contrast, if the collision can be avoided in the pre-defined time period [524: YES], then 528 is performed where the AV is optionally caused to perform a cautious maneuver (e.g., mildly slow down). Techniques for causing an AV to take a cautious maneuver such as slowing down are well known in the art. Any known or to be known technique for causing an AV to take a cautious maneuver can be used here. Subsequently, 530 is performed where method 500 ends or other processing is performed.

Figure 6:
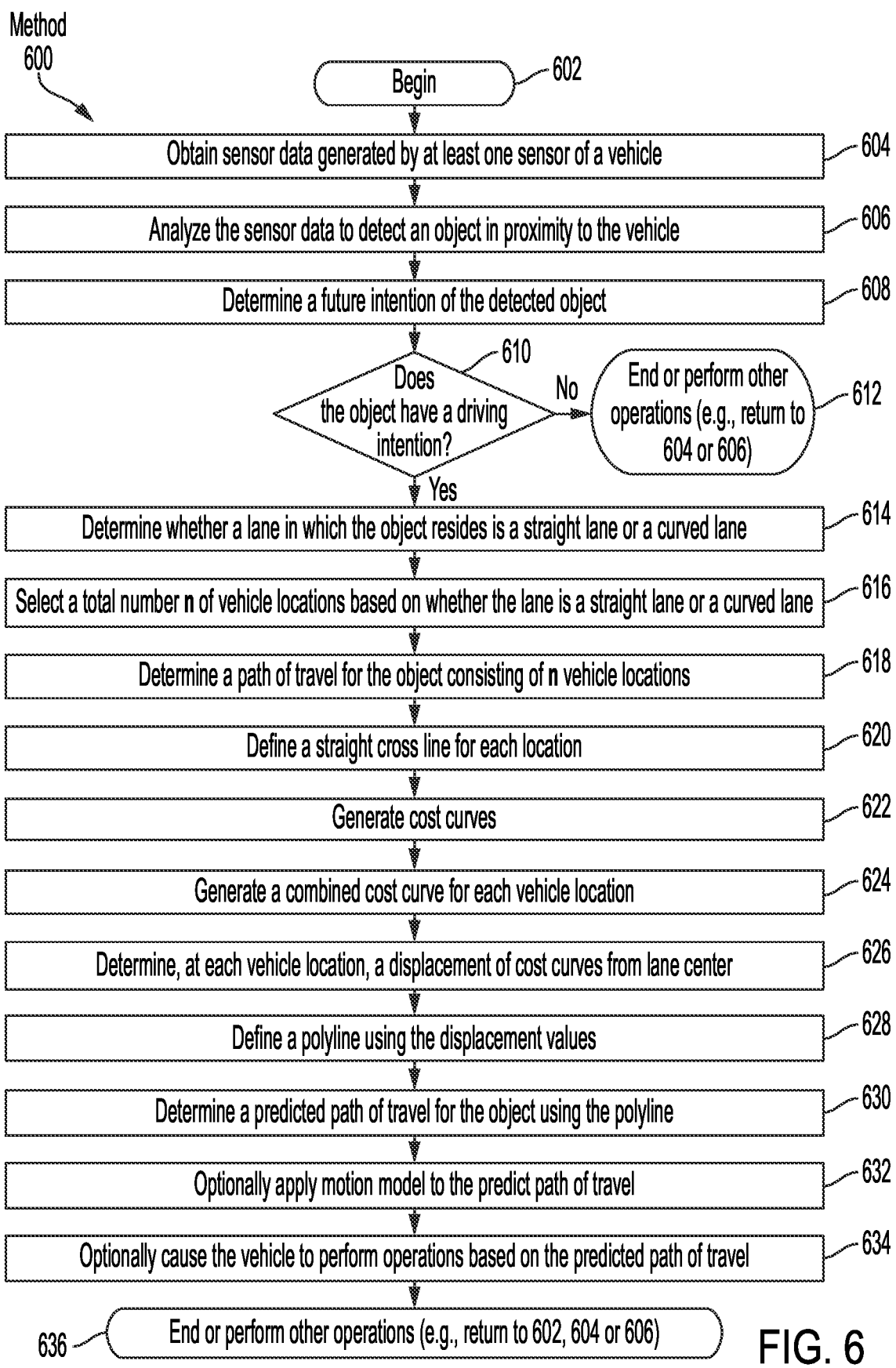
FIG. 6 provides a flow diagram of an illustrative method for Autonomous Vehicle (AV) motion planning using a predicted trajectory for a detected object.

Referring now to FIG. 6, there is provided a flow diagram of an illustrative method 600 for AV motion planning using a predicted trajectory/path of travel for a detected object. Method 600 can be performed by the vehicle $102_1$ of FIG. 1, computing device 110 of FIG. 1, vehicle on-board computing device 220 of FIG. 2, and/or computing device 300 of FIG. 3.

As shown in FIG. 6, method 600 begins with 602 and continues with 604 where the computing device obtains sensor data generated by at least one sensor of a vehicle (e.g., vehicle $102_1$ of FIG. 1). The sensor data can include, but is not limited to, images captured by a camera (e.g., camera 262 of FIG. 2) of the vehicle, and/or LiDAR data generated by a LiDAR system (e.g., LiDAR system 264 of FIG. 2) of the vehicle. The sensor data is analyzed by the computing device in 606 to detect an object in proximity to the vehicle. Algorithms for object detection are well known in the art. An illustrative object detection algorithm that can be employed here in the well-known Convolutional Neural Network (CNN) based object detection algorithm). The operations performed in 606 can also involve: determining a type of object (e.g., vehicle or pedestrian), a bounding box for the detected object, a current location of the detected object, a distance of the detected object from the vehicle, and a direction of the detected object relative to the vehicle. The current location of the detected object is defined by an x-coordinate, a y-coordinate and a z-coordinate.

Once an object has been detected, the computing device performs operations in 608 to determine a future intention for the detected object. This determination can be achieved in accordance with the process described in U.S. patent application Ser. No. 17/179,503 and U.S. patent application Ser. No. 17/179,510. The contents of this patent application are incorporated by reference in their entirety. Generally, this process involves: projecting the current location of the detected object into the 3D space of a 3D road map to define a data point; and determining whether the object has a driving intention based on whether the object resides in a lane of a road. 3D road maps are well known. Alternatively or additionally, the future intention can be determined based on information received from a communication device of the vehicle (e.g., via information received from a communication device (e.g., a transceiver, a beacon and/or a smart phone) of the object via communication link(s) 150, 152 and/or 154 of FIG. 1). This information can specify one or more future intentions of the object.

If the data point does not reside in or is not in proximity to the boundaries of any lane specified in the 3D road map, then a determination is made that the object has a future intention other than a driving intention (e.g., a parking intention). In this case [610: NO], 612 is performed where method 600 ends or other operations are performed (e.g., return to 604 or 606 so that the process can be performed for another detected object).

If the data point resides within or in proximity to the boundaries of a given lane specified in the 3D road map, then a determination is made that the detected object resides in the given lane. Accordingly, the given lane is identified as a lane in which the object resides, and a determination is made that the object has a driving intention. In this case [610: YES], method 600 continues with 614.

In 614, the computing device performs operations to determine whether the given lane is a straight lane or a curved lane using lane geometry defined in the 3D road map. A total number n of vehicle locations is selected in 616 based on whether the lane is a straight lane or a curved lane. For example, the number n is 10 for a straight lane and 16 for a curved lane. The present solution is not limited in this regard. The number n can be the same or different for (i) straight and curved lanes and/or (ii) left lanes and right lanes with adjacent parked cars. The number n can be selected for both straight and curved lanes in accordance with a given application. In some scenarios, the number n is pre-defined for each of a straight lane and a curved lane. In other scenarios, the number n is dynamically determined in accordance an algorithm which considers various factors such as a length of the straight lane, lane speed, a turning radius of the curved lane, a lane width, a turning speed (e.g., a maximum recommended turning speed), and/or turn direction (e.g., left or right). The listed factors may be weighted differently in the algorithm.

Figure 7:
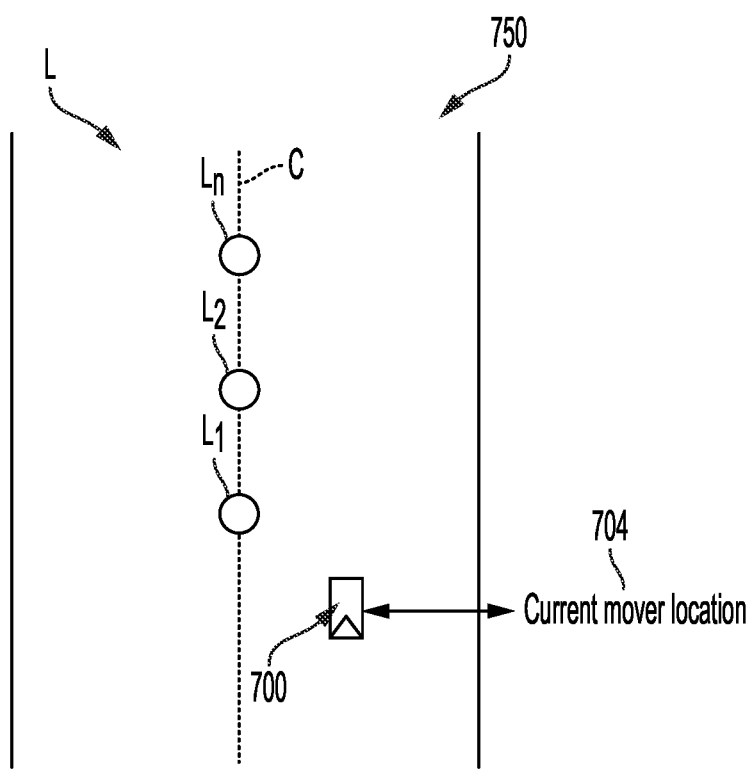
FIGS. 7-18 provide illustrations that are useful for understanding the method shown in FIG. 6.

Next in 618, the computing device determines at least one path of travel for the object. The path of travel comprises a number of data points equal to the selected total number n of vehicle locations. The manner in which the path of travel is determined will be explained with reference to FIG. 7. As shown in FIG. 7, the object 700 comprises a vehicle. The path of travel for the object 700 is determined using a center C of the given lane 750. The path of travel is defined by a polyline L consisting of n vehicle locations $L_1, L_2, \ldots, L_n$. Each vehicle location $L_1, L_2, \ldots, L_n$ is shown by a circular data point having a center that this aligned with and resides on the given lane's center C. The circles are equally spaced apart along a length of the given lane's center C. Each vehicle location $L_1, L_2, \ldots, L_n$ is longitudinally offset from the vehicle's current location 704.

Figure 8:
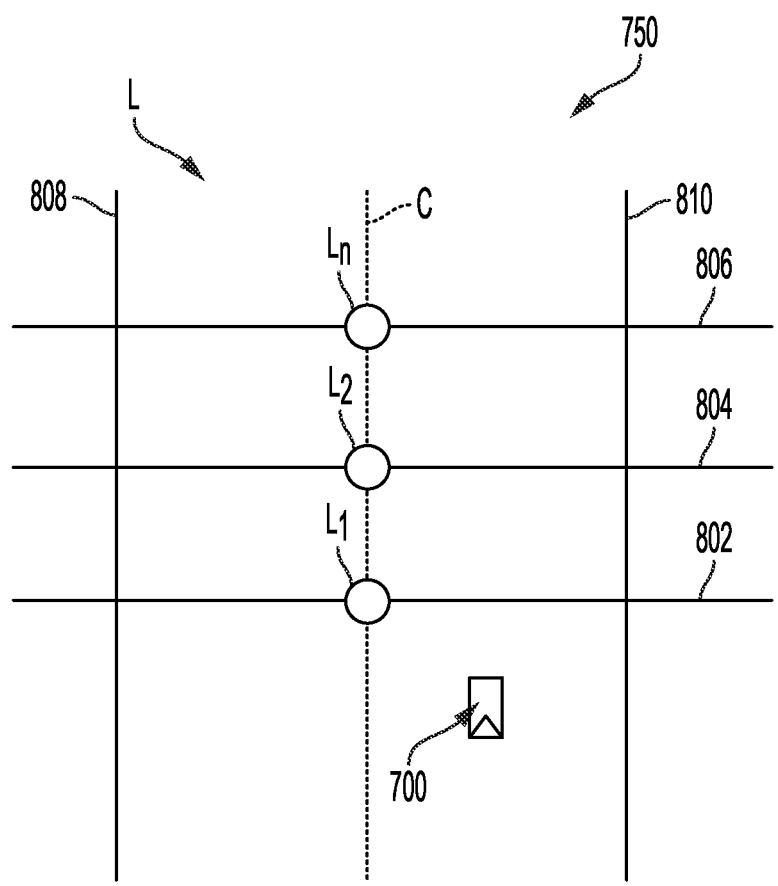

Referring again to FIG. 6, the computing device defines a straight cross line for each location $L_1, L_2, \ldots, L_n$, as shown by 620. An illustrative straight cross line 802, 804, 806 for vehicle locations $L_1, L_2, \ldots, L_n$ are shown in FIG. 8. Each cross line extends perpendicular to and between boundary lines 808, 810 of the given lane 750, and passes through the center of the circular data point for the respective vehicle location. For example, cross line 802 extends perpendicular to and between boundary lines 808, 810 of the given lane 750, and passes through the center of the circular data point for vehicle location $L_1$. Cross line 804 extends perpendicular to and between boundary lines 808, 810 of the given lane 750, and passes through the center of the circular data point for vehicle location $L_2$. 806 extends perpendicular to and between boundary lines 808, 810 of the given lane 750, and passes through the center of the circular data point for vehicle location $L_n$.

Figure 9:
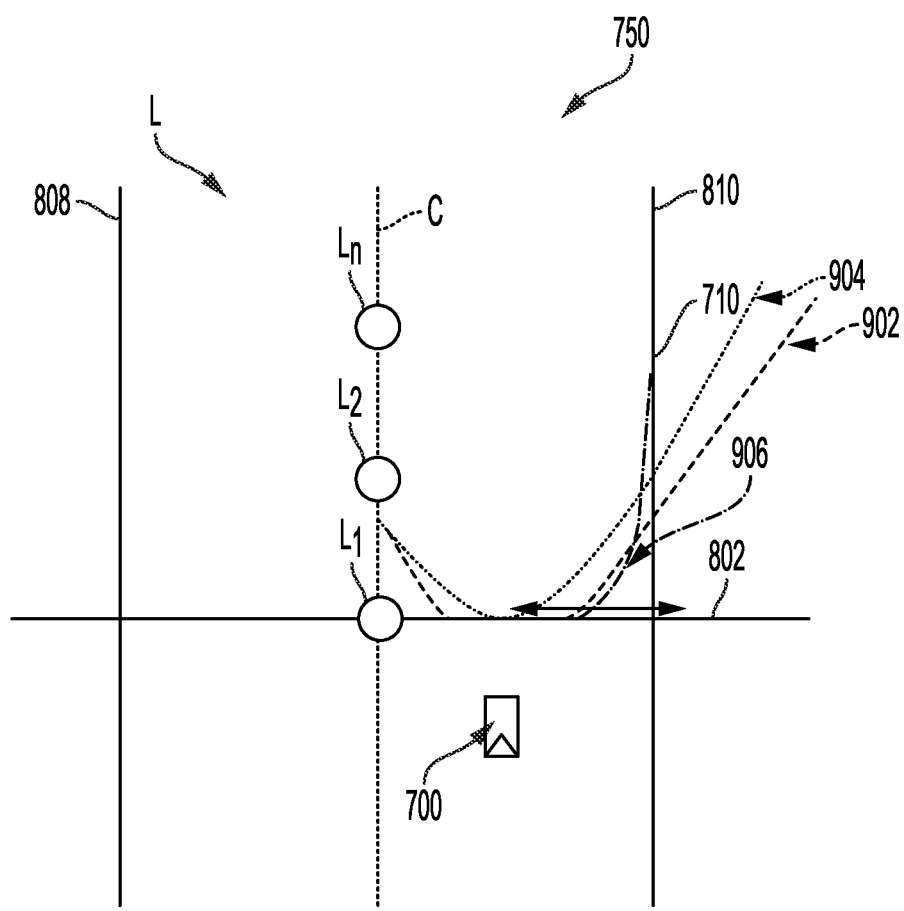

In 622 of FIG. 6, the computing device generates cost curves. Each cost curve represents a displacement cost to be at a particular location along a given cross line. Illustrative cost curves 902, 904, 906 generated for cross line 802 are shown in FIG. 9. Each cost curve 902, 904, 906 is generated by obtaining a set of pre-defined or machine-learned cost functions for the type of object which was previous determined in 606. The set of pre-defined or machine-learned cost functions includes, but is not limited to, a first cost function representing a distance from the object 700 to a left lane boundary 808, a second cost function representing a distance from the object 700 to a right lane boundary 810, a third cost function representing how close the object should follow the center C of the given lane 750, a fourth cost function representing location consistencies to left and right lane boundaries 808 and 810, and/or a fifth cost function representing locations that are close to static obstacles (e.g., signs, trees, parked vehicles, etc.). Each of the pre-defined or machine-learned cost functions of the set can include, but is not limited to, a linear function, a Quadratic function and/or a Huber function. Linear, quadratic and Huber functions are well known. The pre-defined or machine-learned cost functions can be the same or different for different types of objects.

In some scenarios, a cost function comprises a Quadratic cost function defined by the following mathematical equation (1) or (2).

$$f(x)=w*(x-o)^2 \quad (1)$$

$$f(x)=wx^2-2wox+o^2 \quad (2)$$

where w represents weights (which may be pre-defined or machine learned), x represents an x-coordinate of a particular location along a given cross line, and o represents a displacement between the object's current location and the x-axis.

In those or other scenarios, a cost function is defined based on an assumption that the object will preferentially stay in its position in the given lane. Hence, the object's distance from the lane boundaries remains constant or the same. A cost curve may be produced that has a minimum value at the point where the object's distance to a boundary line is the same as the initial offset. The following two approaches may be employed in this case.

Figure 10:
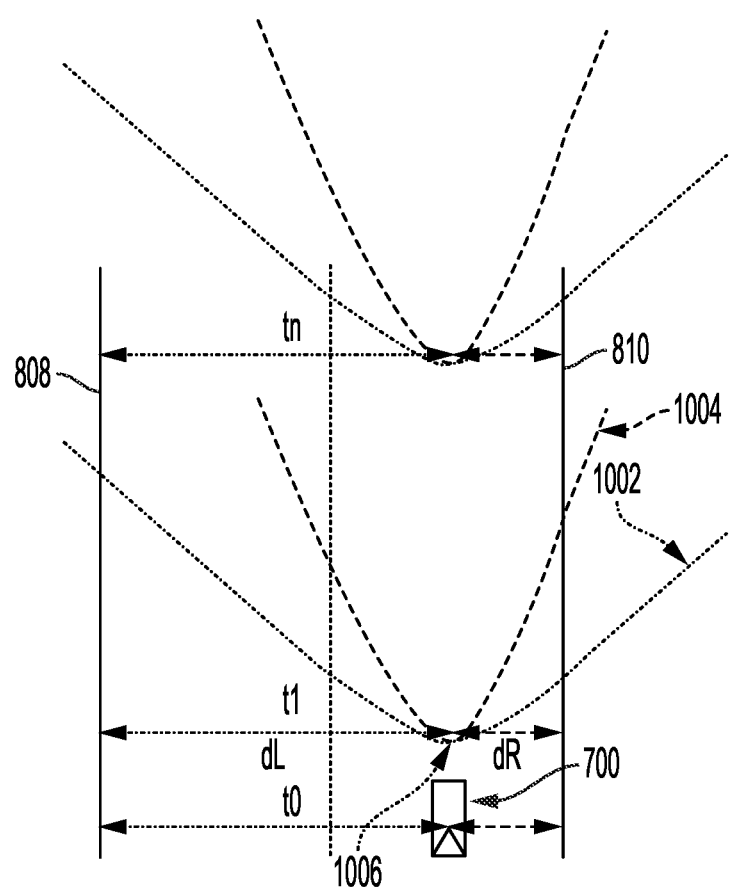

With reference to FIG. 10, a first cost function is employed to generate cost curve 1002, and a second cost function is employed to generate a cost curve 1002. The first cost function represents a distance from a left lane boundary 808. The second cost function represents a distance from the right lane boundary 810. For each sample, the cost function is constructed so that the resulting cost curve has a minimum 1006 at the same distance dR, dL to the lane boundary 808, 810 as the initial offset between the object 700 and the lane boundary. For the object with a lane following intent, the same cost function can be used for the left and right lane boundaries given going toward the boundary or the oncoming traffic would be as bad. For the object with a lane change intent, the cost function can increase faster for the closer lane boundary in order to penalize a change in direction towards that boundary.

An alternatively cost function may be selected to optimize a ratio between two offsets. The cost function has a minimum at the point where the ratio between the distance dR and dL is equal to the initial offset ratio. This gives an advantage of having only one cost function to account for a change in both lane boundaries. Another possible ratio is dL/dTot and dR/dTot, where dTot is a total width of a road or lane. Having these ratios automatically adjusts the position of the object with respect to a change in the road or lane.

Figure 11:
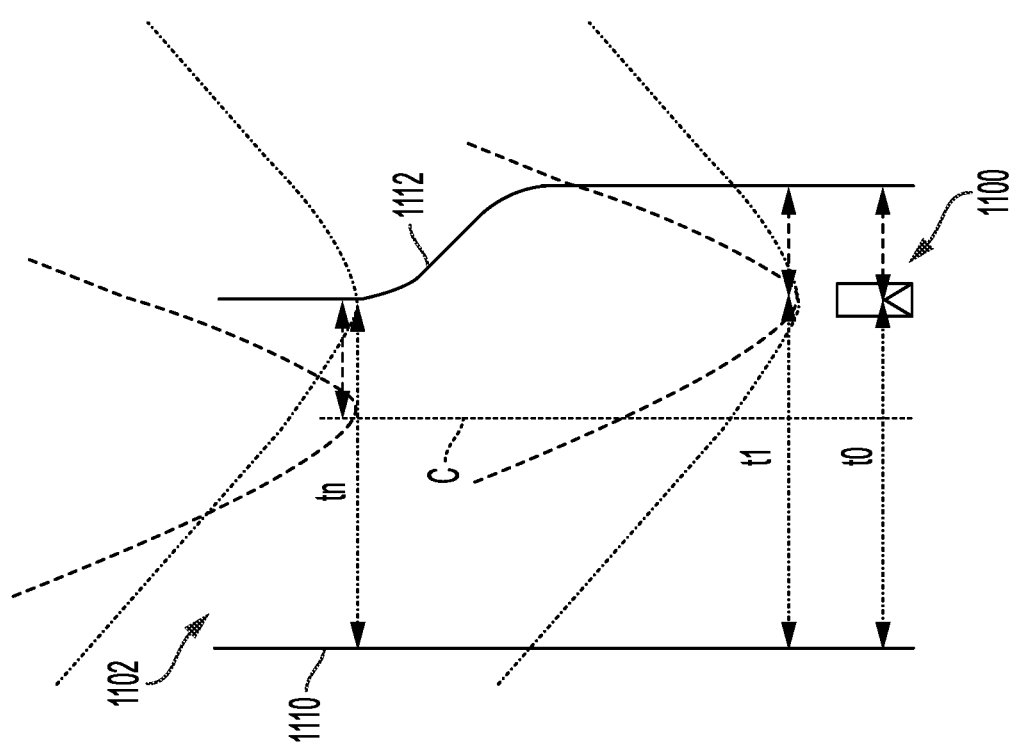

For example, as shown in FIG. 11, a vehicle 1100 is in a narrowing lane 1102. At time t=0, the cost functions minimized at the same point. The lane 1102 narrows from the right, shifting the position of the lane's centerline C. The lateral offset of the vehicle 1100 relative to the left lane boundary line 1110 is unchanged, but the position relative to both the centerline C and the right boundary line 1112 are shifted.

Figure 12:
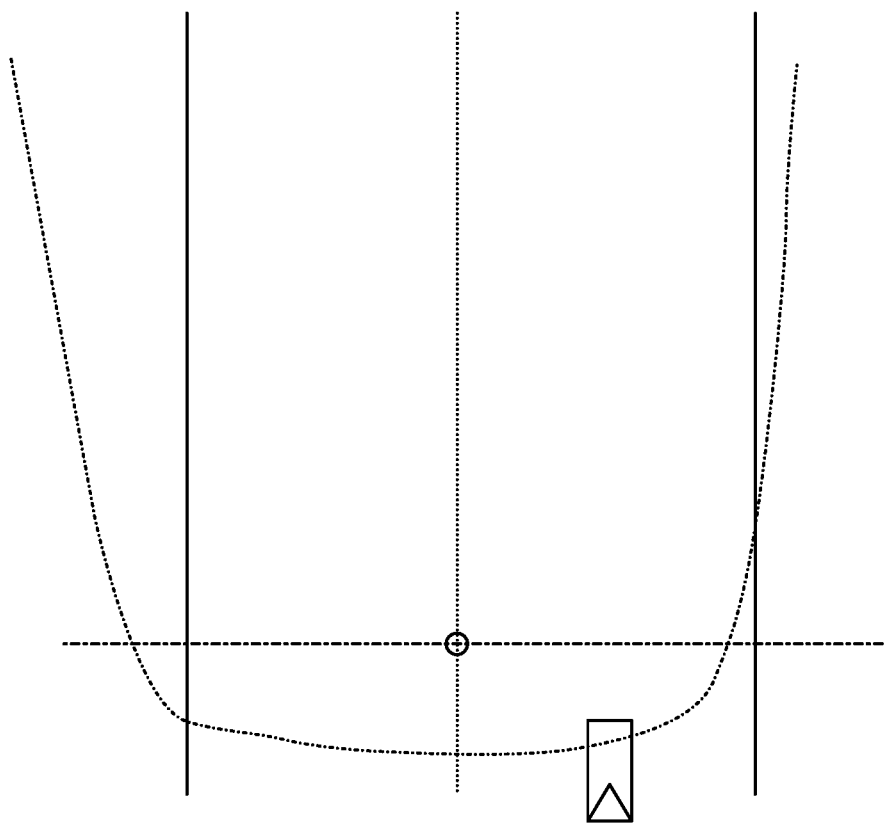

A cost function for the distance from the closest point on the vehicle to each boundary line may penalize driving extremely close to the lane boundaries, assuming the vehicle preferentially stays away from the edges of its lane. The cost function is almost flat on all the other locations, and gives a small contribution to the over cost if the vehicle is far enough from the lane boundaries, as shown in FIG. 12.

A cost function for lateral offset trends takes into account a realistic path. It is assumed that: a larger moving object has a tendency to take wide turns; most of the time the turn is started early on the straight lane before the turn; and a smaller moving object has a tendency to cut corners. A wide turn cost function may be applied to larger moving objects, and a cutting corner cost function may be applied to smaller moving objects.

Figure 13:
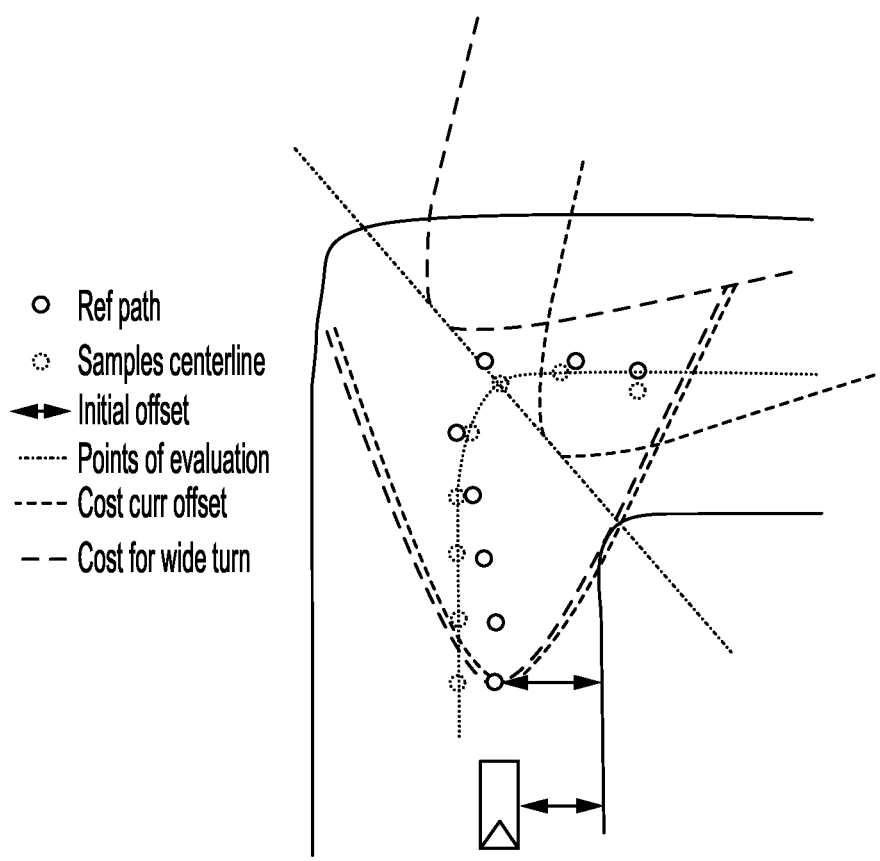

A cost function for a wide turn has a minimum shift in the opposite direction of the lane curvature. The shift is proportional to the lane curvature and the distance between the centerline and the boundary, as shown in FIG. 13. This cost function may be weighed greater than other cost functions given that larger moving objects need to take wider turns than smaller moving objects.

Figure 14:
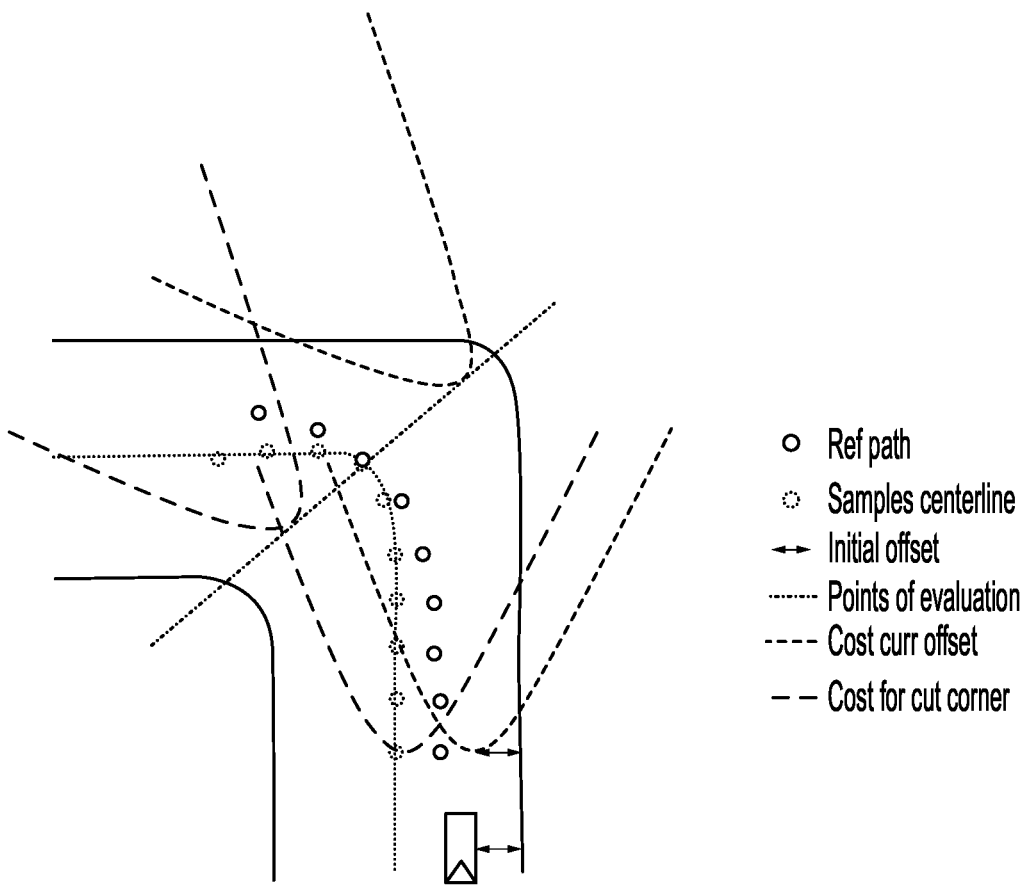

A cost function for cutting corners has a minimum shifted in the direction of the lane curvature. The shift is proportional to the lane curvature and the distance between the centerline and the boundary, as shown in FIG. 14. This cost function may be weighed greater than other cost functions for left turns.

A cost function that takes into account static obstacles may also be employed. When navigating urban environments, moving objects face different kinds of obstacles and veer to avoid the same. The present solution uses a visibility grid that provides a snapshot of the scene around the AV. The visibility grid indicated whether a specific location belongs to a free or occupied cell. Below is provided an illustrative algorithm for implementing this cost function.

Figure 15:
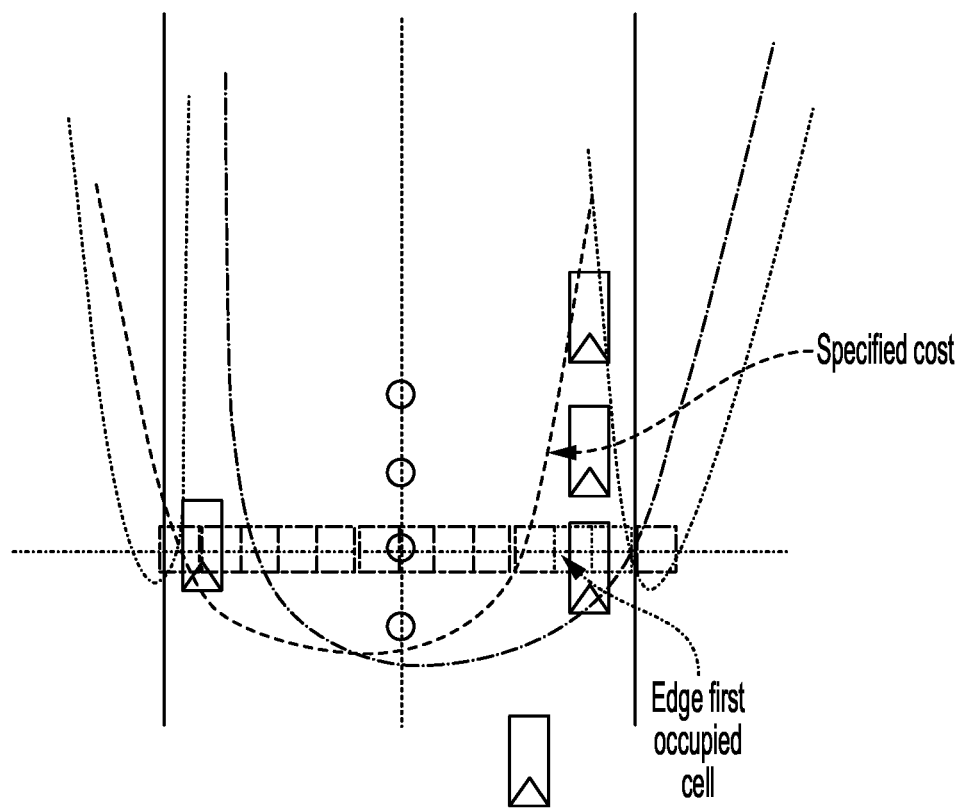

Start from a right boundary and sample locations along the cross line.
occupied=false
For each sample s
if free && ! occupied
   a. create function with high cost at the sample point
   b. occupied=true
If s is occupied && occupied->continue
If free create && occupied
   a. create function with high cost at the sample point
   b. occupied=false A representation of the above algorithm is provided in FIG. 15. The resulting cost function keeps the moving object far from the static objects while adding little cost to the free space. This algorithm may be applied to objects in the middle of the road. In this case, two reference paths (1 per each veering direction) can be provided or the minimum can be computed using a consistency term to avoid huge shifts between two sequential points.

In those or other scenarios, a right side cost function can be defined by the following mathematical equation (3).

$$f(x) = w^*(x-o)^2 \text{ if } x \geq o \text{ \& } 0 \text{ if } x \leq o \text{ with } o = \text{offset} \quad (3)$$

Figure 16:
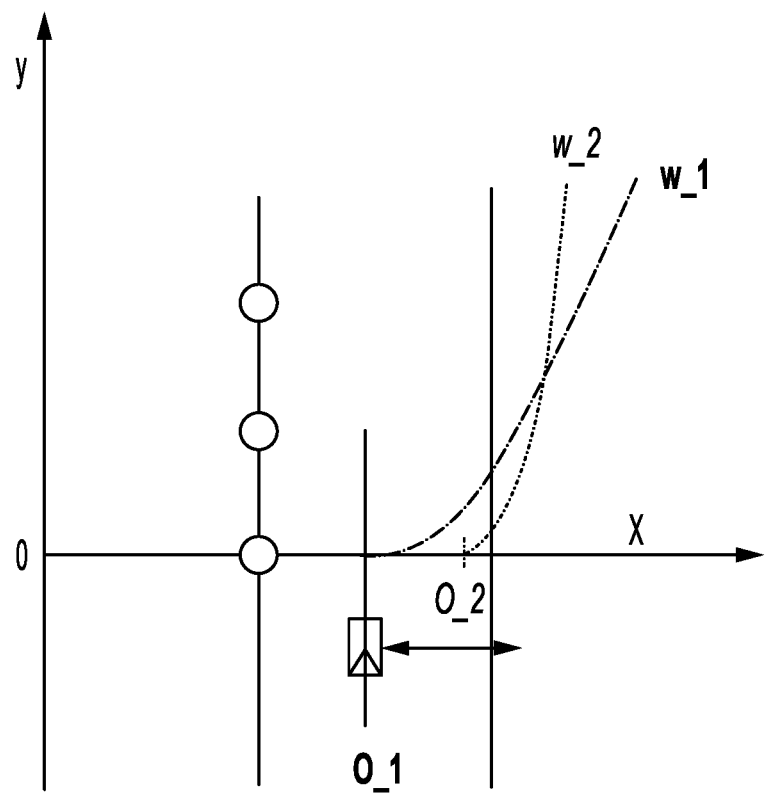

An illustrative representation of this cost function is provided in FIG. 16.

In those or other scenarios, a left side cost function can be defined by the following mathematical equation (4).

$$f(x) = w^*(x-o)^2 \text{ if } x < o \text{ \& } 0 \text{ if } x \geq o \text{ with } o = \text{offset} \quad (4)$$

Figure 17:
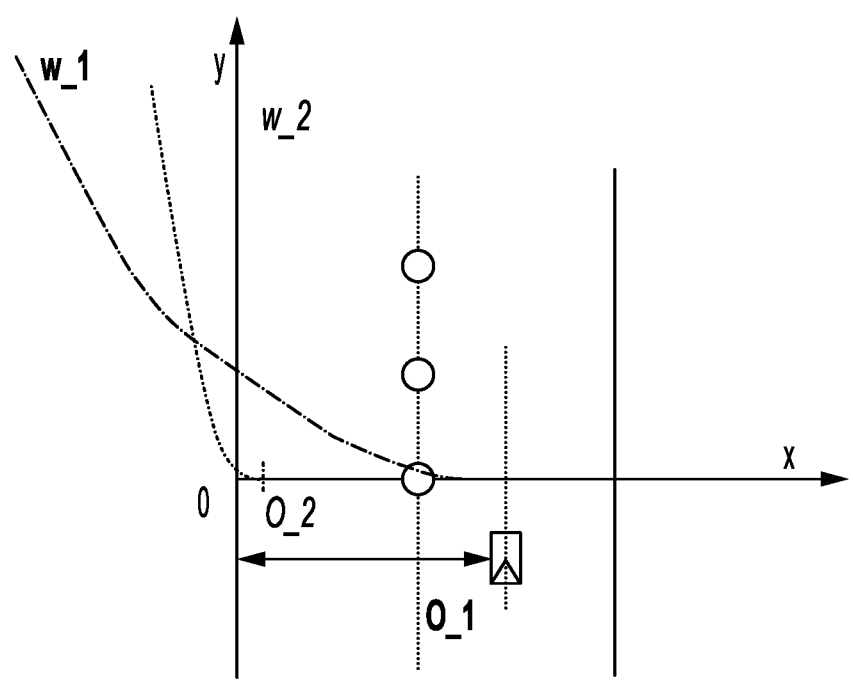

An illustrative representation of this cost function is provided in FIG. 17.

Referring again to FIG. 6, method 600 continues with 624 where a combined cost curve is generated for each vehicle location $L_1, L_2, \ldots, L_n$. In some scenarios, the combined cost curves comprises a weighted sum of the cost curves. The weighted sum can be defined by the following mathematical equation (5).

$$f_1(x) + f_2(x) + \ldots + f_n(x) \propto (w1+w2+ \ldots wn)x^2 - (2w_1o_1 + 2w_2o_2 + \ldots + 2w_no_n) + (w_1o_1^2 + w_2o_2^2 + \ldots + w_no_n^2) \quad (5)$$

Figure 18:
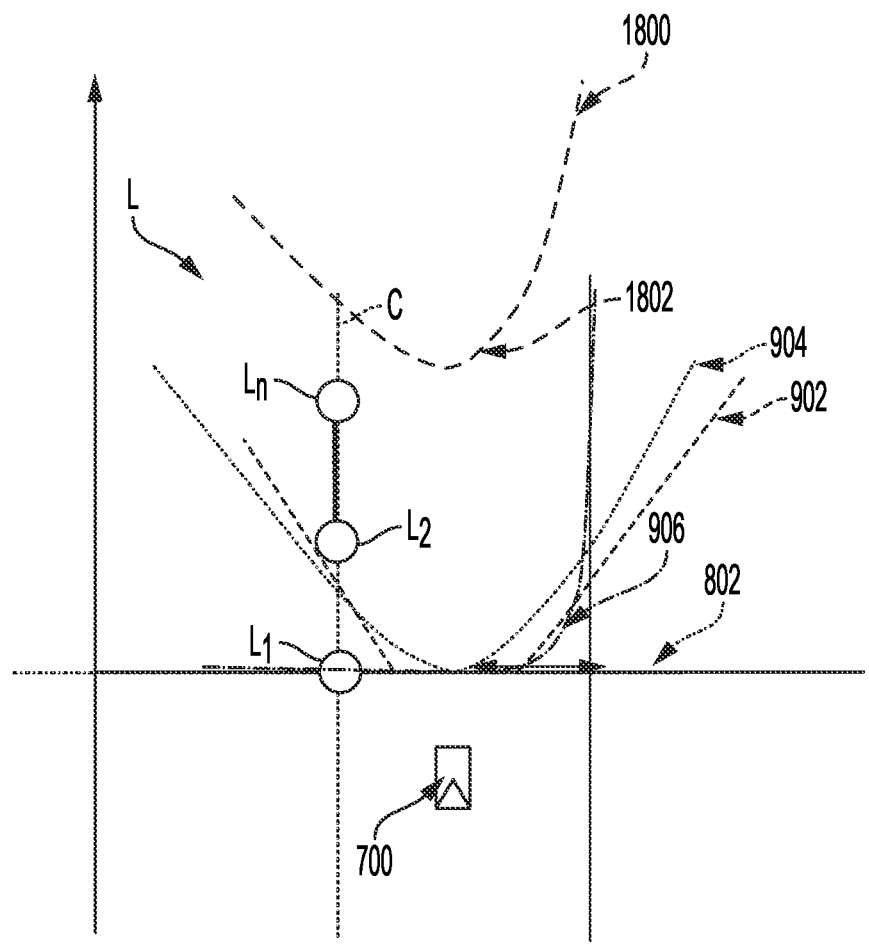

An illustrative weighted sum 1800 for cost curves 902, 904, 906 associated with vehicle location $L_1$ is shown in FIG. 18. The present solution is not limited to the particulars of this scenario.

In 626, the computing device determines, at each vehicle location $L_1, L_2, \ldots, L_n$ in the polyline L, a displacement D of the cost curve from the lane's centerline C. This determination may be made by aggregating cost curves, such as computing a minimum value of a weighted sum cost curve. The minimum value may be defined by the following mathematical equation (6).

$$\min fs(x) = -b/2^*a \text{ with } a = (w1+w2+ \ldots wn) \text{ and } b = -(2w_1o_1 + 2w_2o_2 + \ldots + 2w_no_n) \quad (6)$$

The displacement D may be defined by the following mathematical equation (7).

$$D = \min fs(x) \quad (7)$$

An illustrative minimum value 1802 for weighted sum cost curve 1800 is shown in FIG. 18. A consistency value v may be added to the minimum value to account for any veering around static obstacles, as shown by the following mathematical equation (8).

$$D = \min fs(x) + v \quad (8)$$

In 628, a polyline L' is defined which comprises the data points associated with the displacement values. The polyline L' is made by points each of which is associated with the displacement value calculated with the present method. The points are computed in a coordinate frame which is local to each point. For example, a local coordinate frame is defined as having the x-axis as the crossline passing through the point and intersecting the left and right boundaries and the zero of the frame (x=0, y=0) on the intersection between the crossline and the left boundary. Cost curves are computed in this reference frame. The cost curves are combined and minimized in this reference frame. An optimal point (x, y, z) is obtained in the local coordinate frame. The minimum point is then transformed in a map coordinate frame. This is used to refine the point in the polyline L'. This is repeated for each point. The present solution is not limited to the particulars of this projection technique.

In 630, a predicted path of travel for the object is determined using the polyline L'. In some scenarios, the predicted path of travel follows the polyline L'. Next in 632, a motion model may be optionally applied to the predicted path of travel for the object to generate time space coordinates representing a forecasted path of travel for the object. The operations of 632 can be the same as or substantially similar to those described in U.S. patent Ser. No. 17/104,994 entitled "Method and System For Determining A Mover Model For Motion Forecasting In Autonomous Vehicle Control. The contents of this patent application are incorporated herein by reference in its entirety. In 634, the computing device cause the AV to perform at least one autonomous driving operation based on the predicted path of travel of the detected object and/or the forecasted path of travel for the object. The autonomous driving operation can include, but is not limited to, an object tracking operation, a vehicle trajectory determination operation, and/or a collision avoidance operation. Subsequently, 636 is performed where method 600 ends or other operations are performed (e.g., return to 602, 604 or 606).

The following EXAMPLES are provided to illustrate certain embodiments of the present solution. The following EXAMPLES are not intended to limit the present solution in any way.

EXAMPLE 1

Figure 19:
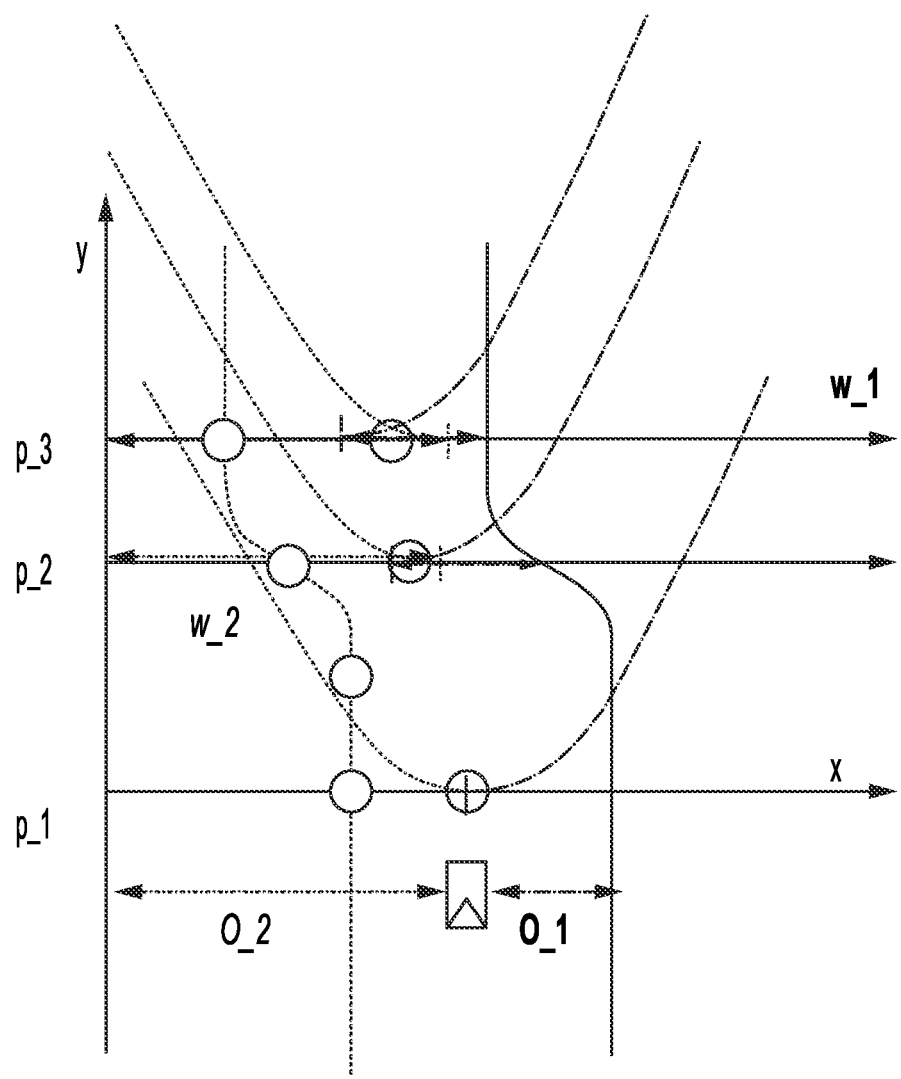
FIG. 19 provides an illustration that is useful for understanding the particulars of a first example.

In this example, the computing device computes the reference path of travel for a moving object shown in FIG. 19. This computation is achieved using a right side cost function $fr(x)$ and a left side cost function $fl(x)$.

The cost functions for the first data point p_1 are defined by following mathematical equations (9) and (10).

$$fr(x)=w_1*(x-o_1)^2=2*(x-7)^2 \text{ offset}=D\ L\_R-D\ M\_R \quad (9)$$

$$fl(x)=w_2*(x-o_2)^2=1*(x-7)^2 \text{ offset}=D\ M\_L \quad (10)$$

where L represents a left boundary of a given lane, R represents a right boundary of a given lane, and M represents the moving object's current location, D L_R represents the distance of a first vehicle location on the polyline from the right boundary line, D M_R represents the distance of the object's current location from the right boundary line, D M_L represents the distance of the object's current location from the left boundary line, $w_1$ represents a first weight, and $w_2$ represents a second weight. Given, that there is one cost function per side, a weighted sum of the cost functions is not determined.

In this example, the value of D L_R for data point p_1 equals 10. The value of D L_R for data point p_2 equals 7. The value of D L_R for data point for p_3 equals 5. The value of D M_R equals 3. The value of D M_L equals 7.

The minimum value for the right side cost function curve is 7 with a weight of W_1 equal to 2. The minimum of the left side cost function curve is also equal 7 with a weight of W_2 equal to 1. So, a first data point p_1 on the predicted path of travel has an x-coordinate equal to 7 (i.e., ((7×2)+(7×1))/3=7).

The cost functions for the second data point p_2 are defined by following mathematical equations (11) and (12).

$$fr(x)=w_1*(x-o_1)^2=2*(x-4)^2 \text{ offset}=D\ L\_R-D\ M\_R \quad (11)$$

$$fl(x)=w_2*(x-o_2)^2=1*(x-7)^2 \text{ offset}=D\ M\_L \quad (12)$$

Give there is one cost function per side, a weighted sum of the cost functions is not determined.

The minimum value for the right side cost function curve is 4 with a weight W_1 equal to 2. The minimum value for the left side cost function curve is 7 with a weight W_2 equal to 1. So, the second data point p_2 on the predicted path of travel has an x-coordinate equal to 5 (i.e., ((4×2)+(7×1))/3=5). The thinning result in a shift towards the left side.

The cost functions for the third data point p_3 are defined by following mathematical equations (13) and (14).

$$fr(x)=w_1*(x-o_1)^2=2*(x-2)^2 \text{ offset}=D\ L\_R-D\ M\_R \quad (13)$$

$$fl(x)=w_2*(x-o_2)^2=1*(x-7)^2 \text{ offset}=D\ M\_L \quad (14)$$

Given there is one cost function per side, a weighted sum of the cost functions is not determined.

The minimum value for the right side cost function curve is 2 with a weight W_R equal to 1. The minimum value for the left side cost function curve is 7 a weight W_L equal to 2. So, the third data point p_3 on the predicted path of travel has an x-coordinate equal to 5.3 (i.e., ((2×1)+(7×2))/3=5.3). The vehicle generally stays to the right side of the lane.

EXAMPLE 2

Figure 20:
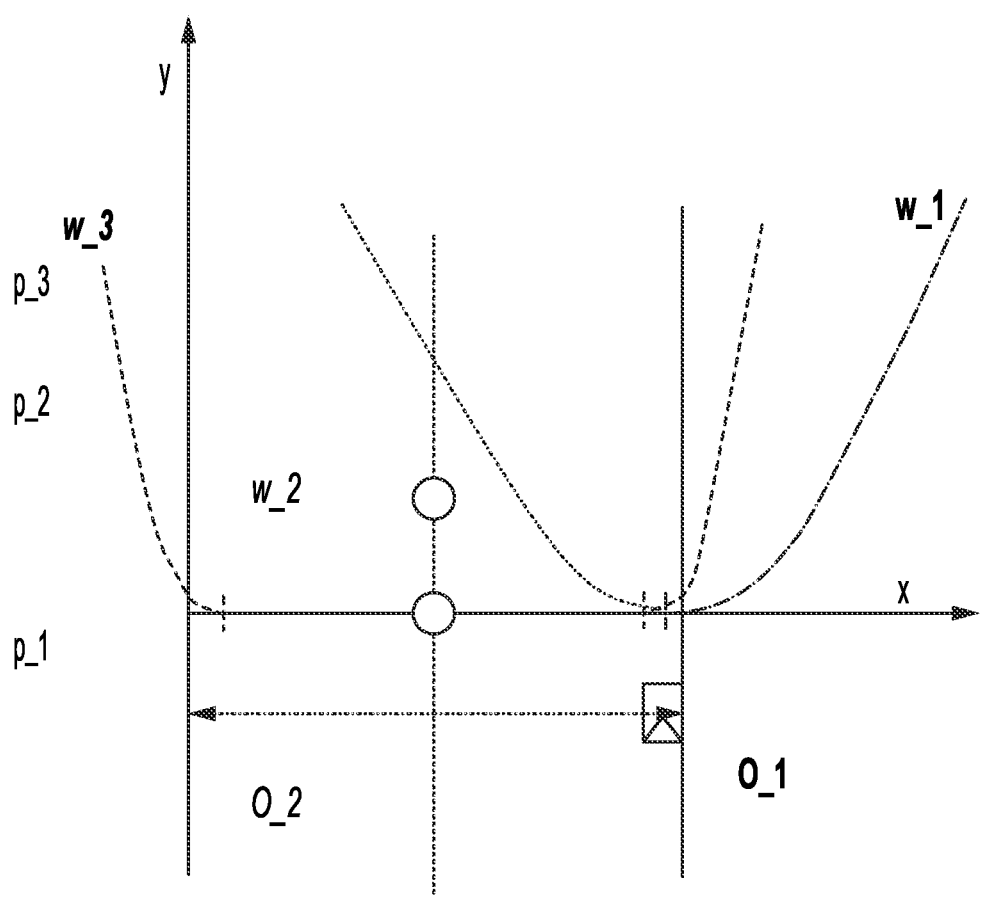
FIG. 20 provides an illustration that is useful for understanding the particulars of a second example.

In this example, the computing device computes the reference path of travel for a moving object shown in FIG. 20. In the present case, the vehicle is relatively close to the lane boundary. As such, the following two constraints are combined: keep the object's position as before; and penalties for data points too close to the lane boundaries.

The right side cost functions are defined by following mathematical equations (15) and (16).

$$fr_1(x)=w_1*(x-o_1)^2=2*(x-9.5)^2 \text{ offset}=D\ L\_R-D\ M\_R \quad (15)$$

$$fr_2(x)=w_2*(x-o_2)^2=1*(x-9)^2 \text{ offset}=D\ L\_R-D\_B \quad (16)$$

where L represents a left lane boundary, R represents a right lane boundary, M represents the moving object's current positon, D L_R represents a distance between the right lane boundary and the left lane boundary, D M_R represents a distance between M and R, D M_L represents a distance between M and L, D_B represents a distance from a given boundary, $w_1$ represents a first weight, and $w_2$ represents a second weight. In the present case, D L_R is equal to 10. D M_R is equal to 0.5. D M_L is equal to 9.5. D_B is equal to 1.0. The weighted sum of the two right side cost functions is defined by the following mathematical equation (17).

$$fr_x(x)=3x^2-56x+261.5 \to c \text{ always ignored} \quad (17)$$

The left side cost functions are defined by following mathematical equations (18) and (19).

$$fl_1(x)=w_1*(x-o_1)^2=1*(x-9.5)^2 \text{ offset}=D\ M\_R \quad (18)$$

$$fl_2(x)=w_2*(x-o_2)^2=1*(x-1)^2 \text{ offset}=D\_B \quad (19)$$

The weighted sum of the two left side cost functions is defined by the following mathematical equation (20).

$$fl_x(x)=2x^2-21x+91.25 \quad (20)$$

The minimum value for the right side cost function curve is 9.3 with a weight W_R equal to 3. The minimum value for the left side cost function curve is 5.25 with a weight W_L equal to 2. So, the first data point p_1 on the predicted path of travel has an x-coordinate equal to 7.7 (i.e., ((9.3×3)+(5.25×2))/5=7.68) (the vehicle was moved from the lane boundary to the lane center).

EXAMPLE 3

Figure 21:
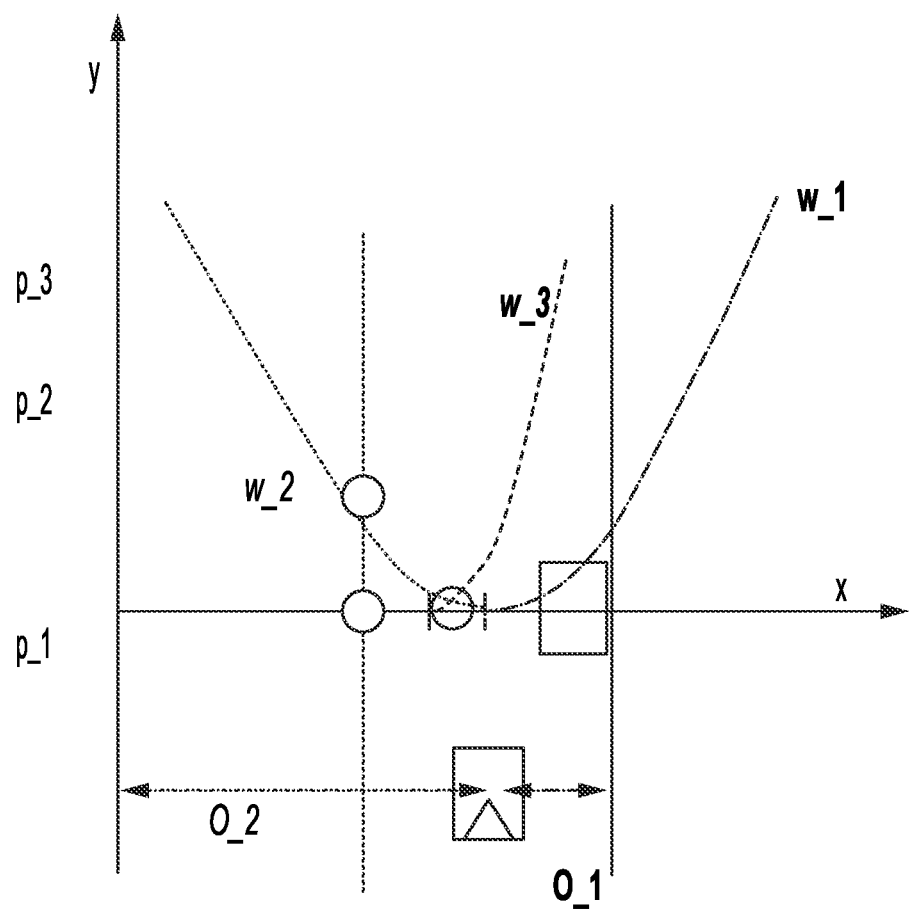
FIG. 21 provides an illustration that is useful for understanding the particulars of a third example.

In this example, the computing device computes the reference path of travel for a moving object shown in FIG. 21. In the present case, there is a static obstacle in from the moving object. Accordingly, the following two constraints are combined: keep the object's position as before; and penalties for data points too close to the static obstacle.

The cost functions are defined by following mathematical equations (21) and (22).

$$fr(x)=w_1*(x-o_1)^2=2*(x-7)^2 \text{ offset}=D\ L\_R-D\ M\_R \quad (21)$$

$$fl(x)=w_3*(x-o_2)^2=5*(x-6)^2 \text{ offset}=D\ M\_L \quad (22)$$

where L represents a left lane boundary, R represents a right lane boundary, M represents the moving object's current position, D L_R represents a distance between the right lane boundary and the left lane boundary, D M_R represents a distance between M and R, D M_L represents a distance between M and L, D S_R represents a distance between the static obstacle and the right lane boundary, $w_1$ represents a first weight, $w_2$ represents a second weight, and $w_3$ represents a third weight. In the present case, D L_R is equal to 10. D M_R is equal to 3. D M_L is equal to 7. D S_R is equal to 4. The weighted sum of the two cost functions is defined by the following mathematical equation (23).

$$fr_s(x)=7x^2-88x+278 \to c \text{ always ignored} \quad (23)$$

The left side cost function is defined by following mathematical equation (24).

$$f_1(x)=w_1*(x-o_1)^2=1*(x-7)^2 \text{ offset}=D\_M\_R \quad (24)$$

Given that there is only one left side cost function, a weighted sum for the left side cost functions is not determined.

The minimum for the right side cost function curve is 6.2 with a weight W_R equal to 7. The minimum for the left side cost function curve is 7 with a weight W_L equal to 1. So, the data point on the predicted path of travel has an x-coordinate equal to 6.3 (i.e., ((6.2×7)+(7×1))/5=6.3). The vehicle is moved from the lane boundary to the lane center.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for operating an autonomous vehicle, comprising:
   detecting, by a computing device, an object in proximity to the autonomous vehicle;
   determining, by the computing device, a path of travel for the object that comprises a number of data points that is equal to a given number of vehicle locations selected based on a geometry of a lane in which the object is positioned;
   generating, by the computing device, cost curves respectively associated with the data points, each cost curve representing a displacement cost to be at a particular location along a given cross line that (i) passes through a respective data point of said data points and (ii) extends perpendicular to and between boundary lines of the lane;
   determining, by the computing device, a polyline representing displacements of the cost curves from a center of the lane;
   defining, by the computing device, a predicted path of travel for the object based on the polyline; and
   using, by the computing device, the predicted path of travel for the object to facilitate at least one autonomous driving operation of the autonomous vehicle.

2. The method according to claim 1, further comprising determining, by the computing device, whether the object has a driving intention.

3. The method according to claim 2, wherein the computing device determines the path of travel for the object when a determination is made that the object has a driving intention.

4. The method according to claim 1, wherein the given number of vehicle locations has different values for straight and curved lanes.

5. The method according to claim 1, wherein each data point of the path of travel is aligned with and resides on a center of the lane in a road map.

6. The method according to claim 1, wherein each data point is longitudinally offset from a current location of the object.

7. The method according to claim 1, wherein the cost curves are generated using at least one of a cost function representing a distance from the object to a left boundary of the lane, a cost function representing a distance from the object to a right boundary of the lane, a cost function representing how close the object should follow a center of the lane, a cost function representing location consistencies to the left and right boundaries of the lane, and a cost function representing locations that are close to static obstacles.

8. The method according to claim 1, further comprising generating combined cost curves by combining the cost curves associated with each said data points.

9. The method according to claim 8, wherein the polyline comprises data points with coordinate values determined based on the minimum values of the combined cost curves.

10. The method according to claim 1, further comprising determining a forecasted path of travel for the object based on the predicted path of travel.

11. A system, comprising:
    a processor;
    a non-transitory computer-readable storage medium comprising programming instructions that are configured to cause the processor to implement a method for operating an autonomous vehicle, wherein the programming instructions comprise instructions to:
      detect an object in proximity to the autonomous vehicle;
      determine a path of travel for the object that comprises a number of data points that is equal to a given number of vehicle locations selected based on a geometry of a lane in which the object is positioned;
      generate cost curves respectively associated with the data points, each cost curve representing a displacement cost to be at a particular location along a given cross line that (i) passes through a respective data point of said data points and (ii) extends perpendicular to and between boundary lines of the lane;
      determine a polyline representing displacements of the cost curves from a center of the lane;
      define a predicted path of travel for the object based on the polyline; and
      use the predicted path of travel for the object to facilitate at least one autonomous driving operation of the autonomous vehicle.

12. The system according to claim 11, wherein the programming instructions further comprise instruction to determine whether the object has a driving intention.

13. The system according to claim 12, wherein the path of travel for the object is determined when a determination is made that the object has a driving intention.

14. The system according to claim 11, wherein the given number of vehicle locations has different values for straight and curved lanes.

15. The system according to claim 11, wherein each data point of the path of travel is aligned with and resides on a center of the lane in a road map.

16. The system according to claim 11, wherein each data point is longitudinally offset from a current location of the object.

17. The system according to claim 11, wherein the cost curves are generated using at least one of a cost function representing a distance from the object to a left boundary of the lane, a cost function representing a distance from the object to a right boundary of the lane, a cost function representing how close the object should follow a center of the lane, a cost function representing location consistencies to the left and right boundaries of the lane, and a cost function representing locations that are close to static obstacles.

18. The system according to claim 11, wherein the programming instructions further comprise instruction to generate combined cost curves by combining the cost curves associated with each said data points.

19. The system according to claim 18, wherein the polyline comprises data points with coordinate values determined based on the minimum values of the combined cost curves.

20. The system according to claim 11, wherein the programming instructions further comprise instruction to determine a forecasted path of travel for the object based on the predicted path of travel.

* * * * *